(12) United States Patent
Burke et al.

(10) Patent No.: US 11,795,666 B2
(45) Date of Patent: Oct. 24, 2023

(54) WIRELESS COMMUNICATION SYSTEM WITHIN A MECHANICAL ROOM

(71) Applicant: Watts Regulator Co., North Andover, MA (US)

(72) Inventors: Joseph Michael Burke, Deerfield, NH (US); Ian David Baynes, Merrimac, MA (US)

(73) Assignee: Watts Regulator Co., North Andover, MA (US)

( * ) Notice: Subject to any disclaimer, the term of this patent is extended or adjusted under 35 U.S.C. 154(b) by 346 days.

(21) Appl. No.: 16/915,090

(22) Filed: Jun. 29, 2020

(65) Prior Publication Data

US 2020/0358852 A1    Nov. 12, 2020

Related U.S. Application Data

(63) Continuation-in-part of application No. 16/870,000, filed on May 8, 2020.

(60) Provisional application No. 62/869,195, filed on Jul. 1, 2019, provisional application No. 62/844,912, filed on May 8, 2019.

(51) Int. Cl.
| | |
|---|---|
| *E03B 7/07* | (2006.01) |
| *H04W 4/38* | (2018.01) |
| *H04B 3/46* | (2015.01) |
| *H04B 3/54* | (2006.01) |
| *F16K 37/00* | (2006.01) |
| *E03C 1/10* | (2006.01) |

(52) U.S. Cl.
CPC ............... *E03B 7/077* (2013.01); *E03C 1/10* (2013.01); *E03C 1/104* (2013.01); *F16K 37/0091* (2013.01); *H04B 3/46* (2013.01); *H04B 3/546* (2013.01); *H04W 4/38* (2018.02)

(58) Field of Classification Search
None
See application file for complete search history.

(56) References Cited

U.S. PATENT DOCUMENTS

| 213,394 A | 3/1879 | Cornwal |
|---|---|---|
| 2,310,586 A | 2/1943 | Lohman |

(Continued)

FOREIGN PATENT DOCUMENTS

| CN | 110081212 A | 8/2019 |
|---|---|---|
| DE | 1925477 U | 12/1970 |

(Continued)

OTHER PUBLICATIONS

Lead Free Master Series LF870V product specifications pages, ES-F-LF-870V 1826, 2018, 4 pages.

(Continued)

*Primary Examiner* — Adolf Dsouza
(74) *Attorney, Agent, or Firm* — Day Pitney LLP; George N. Chaclas

(57) ABSTRACT

A wireless communication system includes a plurality of sensors and a device. Each sensor is configured to measure data and communicate over a network using low power signal communication. The device is connected to an in-wall power source and configured to wirelessly communicate over the network using low power signal communication. Further, the device is configured to transmit data from the sensors to a remote gateway using high power signal communication.

16 Claims, 17 Drawing Sheets

PRIOR ART

(56) References Cited

U.S. PATENT DOCUMENTS

| | | |
|---|---|---|
| 2,514,374 A | 7/1950 | Cooper |
| 2,827,921 A | 3/1958 | Sherman et al. |
| 3,173,439 A | 3/1965 | Griswold et al. |
| 3,189,037 A | 6/1965 | Modesto |
| 3,429,291 A | 2/1969 | Hoffman |
| 3,570,537 A | 3/1971 | Kelly |
| 3,817,278 A | 6/1974 | Elliott |
| 3,837,357 A | 9/1974 | Slaughter |
| 3,837,358 A | 9/1974 | Zieg et al. |
| 3,859,619 A | 1/1975 | Ishihara et al. |
| 3,896,850 A | 7/1975 | Waltrip |
| 3,905,382 A | 9/1975 | Waterston |
| 3,906,987 A | 9/1975 | Rushforth et al. |
| 3,996,962 A | 12/1976 | Sutherland |
| 4,014,284 A | 3/1977 | Read |
| 4,244,392 A | 1/1981 | Griswold |
| 4,284,097 A | 8/1981 | Becker et al. |
| 4,416,211 A | 11/1983 | Hoffman |
| 4,453,561 A | 6/1984 | Sands |
| 4,489,746 A | 12/1984 | Daghe et al. |
| 4,523,476 A | 6/1985 | Larner |
| 4,618,824 A | 10/1986 | Magee et al. |
| 4,667,697 A | 5/1987 | Crawford |
| 4,694,859 A | 9/1987 | Smith |
| 4,776,365 A | 10/1988 | Bathrick et al. |
| 4,777,979 A | 10/1988 | Twerdochlib |
| 4,920,802 A | 5/1990 | McMullin et al. |
| 4,945,940 A | 8/1990 | Stevens |
| 5,008,841 A | 4/1991 | McElroy |
| 5,024,469 A | 6/1991 | Aitken et al. |
| 5,072,753 A | 12/1991 | Ackroyd |
| 5,125,429 A | 6/1992 | Ackroyd et al. |
| 5,236,009 A | 8/1993 | Ackroyd |
| 5,299,718 A | 4/1994 | Shwery |
| 5,404,905 A | 4/1995 | Lauria |
| 5,425,393 A | 6/1995 | Everett |
| 5,452,974 A | 9/1995 | Binns |
| 5,520,367 A | 5/1996 | Stowers |
| 5,551,473 A | 9/1996 | Lin et al. |
| 5,566,704 A | 10/1996 | Ackroyd et al. |
| 5,584,315 A | 12/1996 | Powell |
| 5,586,571 A | 12/1996 | Guillermo |
| 5,669,405 A | 9/1997 | Engelmann |
| 5,711,341 A | 1/1998 | Funderburk et al. |
| 5,713,240 A | 2/1998 | Engelmann |
| 5,901,735 A | 5/1999 | Breda |
| 5,918,623 A | 7/1999 | Hidessen |
| 5,947,152 A | 9/1999 | Martin et al. |
| 5,992,441 A | 11/1999 | Enge et al. |
| 6,021,805 A | 2/2000 | Horne et al. |
| 6,123,095 A | 9/2000 | Kersten et al. |
| 6,155,291 A | 12/2000 | Powell |
| 6,170,510 B1 | 1/2001 | King et al. |
| 6,234,180 B1 | 5/2001 | Davis et al. |
| 6,343,618 B1 | 2/2002 | Britt et al. |
| 6,349,736 B1 | 2/2002 | Dunmire |
| 6,374,849 B1 | 4/2002 | Howell |
| 6,378,550 B1 | 4/2002 | Herndon et al. |
| 6,443,184 B1 | 9/2002 | Funderburk |
| 6,471,249 B1 | 10/2002 | Lewis |
| 6,513,543 B1 | 2/2003 | Noll et al. |
| 6,546,946 B2 | 4/2003 | Dunmire |
| 6,581,626 B2 | 6/2003 | Noll et al. |
| 6,659,126 B2 | 12/2003 | Dunmire et al. |
| 6,675,110 B2 | 1/2004 | Engelmann |
| 7,051,763 B2 | 5/2006 | Heren |
| 7,114,418 B1 | 10/2006 | Allen |
| 7,434,593 B2 | 10/2008 | Noll et al. |
| 7,506,395 B2 | 3/2009 | Eldridge |
| 7,784,483 B2 | 8/2010 | Grable et al. |
| 7,934,515 B1 | 5/2011 | Towsley et al. |
| 8,220,839 B2 | 7/2012 | Hall |
| 8,997,772 B2 | 4/2015 | Noll et al. |
| 9,091,360 B2 | 7/2015 | Frahm |
| 9,539,400 B2 | 1/2017 | Gumaste et al. |
| 9,546,475 B2 | 1/2017 | Lu |
| 9,899,819 B1* | 2/2018 | Holloway ............ H01R 9/2675 |
| 9,995,605 B2 | 6/2018 | Konno et al. |
| 10,132,425 B2 | 11/2018 | Di Monte |
| 10,561,874 B2 | 2/2020 | Williams et al. |
| 10,719,904 B2 | 7/2020 | Yasumuro et al. |
| 10,883,893 B2 | 1/2021 | Shaw et al. |
| 10,914,412 B2 | 2/2021 | Doughty et al. |
| 10,962,143 B2 | 3/2021 | Cis et al. |
| 11,137,082 B2 | 10/2021 | Okuno et al. |
| 2002/0043282 A1 | 4/2002 | Horne et al. |
| 2002/0078801 A1 | 6/2002 | Persechino |
| 2003/0000577 A1 | 1/2003 | Noll et al. |
| 2003/0168105 A1 | 9/2003 | Funderburk |
| 2004/0045604 A1 | 3/2004 | Dunmire et al. |
| 2004/0107993 A1 | 6/2004 | Stephens |
| 2005/0092364 A1 | 5/2005 | Furuya et al. |
| 2005/0199291 A1 | 9/2005 | Price et al. |
| 2006/0076062 A1 | 4/2006 | Andersson |
| 2006/0196542 A1 | 9/2006 | Ven |
| 2007/0181191 A1 | 8/2007 | Wittig et al. |
| 2007/0193633 A1 | 8/2007 | Howell et al. |
| 2007/0204916 A1 | 9/2007 | Clayton et al. |
| 2007/0204917 A1 | 9/2007 | Clayton et al. |
| 2007/0240765 A1 | 10/2007 | Katzman et al. |
| 2008/0145739 A1 | 6/2008 | Adams et al. |
| 2008/0289567 A1 | 11/2008 | Gordon |
| 2009/0136935 A1 | 5/2009 | Petersen |
| 2009/0194719 A1 | 8/2009 | Mulligan |
| 2011/0067225 A1 | 3/2011 | Bassaco |
| 2011/0309076 A1 | 12/2011 | Liebenberg et al. |
| 2012/0248759 A1 | 10/2012 | Feith |
| 2013/0026743 A1 | 1/2013 | Baca |
| 2013/0255452 A1 | 10/2013 | Kovach |
| 2014/0109986 A1 | 4/2014 | Cordes |
| 2017/0023141 A1 | 1/2017 | Andersson |
| 2018/0156488 A1 | 6/2018 | Stanley et al. |
| 2019/0043157 A1 | 2/2019 | Yasumuro et al. |
| 2019/0136935 A1 | 5/2019 | Hulstein et al. |
| 2019/0162341 A1 | 5/2019 | Chiproot |
| 2019/0271428 A1 | 9/2019 | O'Connor et al. |
| 2019/0323618 A1 | 10/2019 | Fletcher et al. |
| 2020/0141612 A1 | 5/2020 | Thibodeaux |
| 2020/0370677 A1* | 11/2020 | Mendez ................. G01L 15/00 |
| 2021/0172157 A1 | 6/2021 | Burke et al. |
| 2021/0230850 A1 | 7/2021 | Bouchard et al. |
| 2021/0332898 A1* | 10/2021 | Cellemme ........... F16K 37/0033 |

FOREIGN PATENT DOCUMENTS

| | | |
|---|---|---|
| DE | 8525261 U1 | 11/1985 |
| DE | 202014102568 U1 | 9/2015 |
| EP | 1521004 A1 | 4/2005 |
| EP | 3434833 A1 | 1/2019 |
| EP | 3832183 A1 | 6/2021 |
| FR | 2928750 A1 | 9/2009 |
| GB | 1231579 | 11/1967 |
| JP | 2002213629 A | 7/2002 |
| WO | 2003060459 A1 | 7/2003 |
| WO | 2020023584 A1 | 1/2020 |

OTHER PUBLICATIONS

Watt TK-99E Backflow Preventer Test Kit Product Specifications and Test Information, IS-TK99E 0829, 2009, 4 pages.
Zurn Wilkins 300AR Series, Backflow Preventer Order Form No. 480-060, 4117, 2 pages.
Watts Water Technologies Company, Installation, Maintenance & Repair Series 909, LF909, 909RPDA, LF909RPDA, 2016, 8 pages.
Watts Water Company, Series 909RPDA for Health Hazard Applications, 2016, 4 pages.
Watts Regulator Co., WATTS ACV 113-6RFP Flood Protection Shutdown Valve for Health Hazard Applications, 2020, 4 pages.
European Search Report for European Patent Application No. 20192133.5 dated Feb. 1, 2021, 9 pages.
Ames Fire & Waterworks, division of Watts Industries, F-A-Spools/Flanges, 2001, 4 pages.

(56) References Cited

OTHER PUBLICATIONS

Watts, S-RetroFit-Simple, 2017, 2 pages.
Apollo Valves, Apollo backflow preventer in-line "R" retrofit series, 2 pages.
*Zurn Industries, LLC* vs. *Conbraco Industries, Inc.*, Complaint for patent infringement, United States District Court for the Center District of California Western Division, Case No. 2.16-CV-5656, Jul. 29, 2016; 5 pages.
Wilkins Company, Model 375/475MS Series, Installation, Maintenance and Instruction Sheet, 2006, 1 page.
Wilkins Model 420 XL Lead-Free pressure Vacuum Breakers 1/2", 3/4", and 1", pp. 60-70.
Apollo Valves PVB4A Series Installation, Operation and Maintenance Manual for Model PVB4A 1/2"-2" Pressure Vacuum Breaker Backflow Preventer, dated Jan. 11, 2012, 12 pages.
Apollo Valves PVB4A Series Installation, Operation, and Maintenance Manual, copyright May 2009, 9 pages.
Watts Water Technologies Company Brochure ES LF800M4QT for Health Hazard Applications Lead Free Series LF8 M4QT Anti-Siphon Vacuum Breakers Sizes 1/2"-2", copyright 2013, 4 pages.
Conbraco BFMMPVB Maintenance Manual for Series 4V-500 1/2"-2" Pressure Type Vacuum Breaker, 04/02, Conbraco Industries, Inc., Matthews, North Carolina 28106, 6 pages.
Watts, "Double Check Valve Assembly Backflow Preventers, Bronze," Article 1, 2021, 6 pages.
Watts, "Reduced Pressure Zone Assembly Backflow Preventers, Bronze Body, Sizes 1/4-2 IN," Article 1, 2021, 16 pages.
Miscellaneous Communication issued in European patent application No. 20211811.3, dated Apr. 5, 2021, 8 pages.
Office Action issued in corresponding Chinese patent application No. 20201920527.3, dated Mar. 10, 2021, 1 page (translation unavailable).
International Search Report and Written Opinion issued in corresponding international patent application No. PCT/US2021/046208, dated Dec. 1, 2021, 8 pages.
International Search Report and Written Opinion issued in corresponding International Patent Application No. PCT/US2021/062395, dated Feb. 23, 2022, 14 pages.
International Search Report and Written Opinion issued in corresponding International Patent Application No. PCT/US2021/046101, dated Nov. 22, 2021, 8 pages.
Extended European Search Report received for European Patent Application No. 20211811.3, dated May 4, 2021, 2 pages.

\* cited by examiner

WIRELESS COMMUNICATION SYSTEM WITHIN A MECHANICAL ROOM

RELATED APPLICATION

This application claims priority to, and is a continuation-in-part of, U.S. patent application Ser. No. 16/870,000 entitled "BACKFLOW PREVENTION SYSTEM TEST COCK WITH A FLUID SENSOR" filed May 8, 2020, which in turn claims priority to U.S. Provisional Patent Application Ser. No. 62/844,912 entitled "Backflow Prevention System Test Cock With A Fluid Sensor," filed May 8, 2019, and U.S. Provisional Patent Application Ser. No. 62/869,195 entitled "Wireless Communication System Within A Mechanical Room," filed Jul. 1, 2019, the entire contents of each of which is incorporated by reference in its entirety for all purposes.

FIELD OF THE DISCLOSURE

The subject disclosure relates to backflow prevention valves and assemblies, and more particularly to a device for continuously monitoring the status of the backflow prevention system. Further, the subject disclosure relates to backflow prevention valves and other devices used in mechanical rooms, and more particularly to wireless communication within and out of mechanical rooms.

BACKGROUND

In many water systems, a backflow prevention valve and assembly, sometimes referred to as a backflow preventer (BFP), assures that a fluid, and any solids therein, flows in only a desired direction, i.e., a forward direction. As back-siphonage, or back pressure, may cause contamination and health problems, a BFP prevents flow in an undesired direction, i.e., a backward or reverse direction. For example, backflow prevention valves and assemblies are installed in buildings, such as residential homes, and commercial buildings and factories, to protect public water supplies by preventing the reverse flow of contaminated water back into the public water supply.

Referring now to FIG. 1, a typical backflow preventer (BFP) 100 includes an inlet shutoff valve 105 and an outlet shutoff valve 110 with a backflow prevention valve 115 positioned between the inlet and outlet shutoff valves where the forward flow direction F is shown. It is noted that many different configurations of backflow prevention assemblies are commercially available, each being different in configuration, and the BFP 100 presented here is merely an example.

There are 2 classes of BFP—testable and non-testable. Testable BFPs are periodically checked for performance. The period can be different for different applications and different jurisdictions, but in some cases testable BFPs are tested an average of once a year to assure proper operating condition. Specifically, fluid pressure measurements are taken at specified locations in the BFP 100. To facilitate these pressure measurements, the BFP 100 includes a number of Test Cocks (TCs) 102a-102d (generally 102), each of which includes a ball valve, where the TC 102 is threadably connected to couple with a fluid path within the BFP 100 via a corresponding TC port 125a-125d (generally 125) on the BFP 100.

There are, in the most common implementation, four TCs 102 located on the BFP 100 in order to allow for temporarily attaching measuring equipment to measure the flow to ensure that the BFP 100 is functioning correctly.

Accordingly, a first TC 102a measures the pressure coming into the BFP 100; a second TC 102b measures the pressure just before a first check valve (not shown); a third TC 102c measures the pressure right after the first check valve; and a fourth TC 102d measures the pressure right after a second check valve (not shown).

Again, because of the public safety importance of the BFP, it is often a certified BFP Technician that conducts the testing to confirm that the BFP is in compliance with national standards bodies' requirements.

It is known to use an Electronic Pressure Sensor (EPS) to measure the fluid pressure at different points within the BFP. As such, a common approach to implementing an EPS redirects flow from a TC port 125 to the EPS. This redirection, however, is implemented by coupling additional plumbing to the BFP 100 and oftentimes requires at least the following items: 1) an EPS; 2) one or more pipe fittings; 3) copper pipe (that will have to be cut to size); 4) one or more elbow fittings; 5) one or more ball valves; 6) installation equipment including, for example, a wrench, a soldering iron and associated solder and flux, etc.; and 7) labor costs for the installation as it needs to be performed by a certified professional.

Through the attachment of measuring equipment (sensors) on the BFPs 100, the BFP could be constantly monitored based on the data output from the sensors which can be measured wirelessly. However, BFPs 100 are generally present in mechanical rooms, which are rooms or spaces in buildings dedicated to the mechanical equipment and its associated electrical equipment, as opposed to rooms intended for human occupancy or storage. In large buildings mechanical rooms can be of considerable size and are often located below ground.

The location and layout of many mechanical rooms disrupt wireless signals and makes their use unreliable. Additionally, common modes of wireless communication to collect the data of the mechanical room, such as Wi-Fi and cellular data transmission, are power intensive modes which require either more power outlets, which are not commonly available, or a skilled electrician to ruin conduit to hard wire the devices. Last, the data collected from the sensors in the BFPs 100 need to be collected by a receiver outside the mechanical room to analyze the data.

What is needed is a better wireless communication system for monitoring the status of a BFP, and for transferring data within, and out of, a mechanical room.

SUMMARY

In light of the needs described above, the subject technology relates to a wireless communication system which allows for data to be effectively communicated within and out of a mechanical room with minimal power consumption, and can be implemented using devices within the mechanical room, including a test cock.

In one aspect of the present disclosure there is a test cock for determining an operating condition of a backflow prevention system comprising: a body portion having a distal end and a proximal end; a space defined within the body portion; a distal opening provided on the body portion at the distal end; a proximal opening provided on the body portion at the proximal end, wherein the proximal opening is in fluid connection with body portion space; a body portion fitting disposed in the body portion, the body portion fitting providing a fluid connection with the body portion space; and a fluid sensor, coupled to the body portion fitting, in fluid connection with the body portion space.

The fluid sensor comprises at least one of: a pressure sensor; a temperature sensor; a pH sensor; a salinity sensor; and a wet/dry sensor.

The test cock can further comprise a ball valve disposed in the body portion in fluid connection with the distal opening and the body portion space. A spring clip can be provided that couples the fluid sensor to the body portion fitting.

The test cock can further comprise a system fitting, having a first end and a second end, the second end provided in the body portion proximal opening. A spring clip can couple the system fitting to the body portion proximal end. The body portion proximal end can be configured to rotate within the system fitting.

Another aspect of the present disclosure is a backflow prevention system comprising a backflow preventer; a system fitting, having a first end and a second end, provided on the backflow preventer; and the test cock referenced above.

In at least one aspect, the subject technology relates to a wireless communication system located within a mechanical room. The system has a valve including at least one sensor. The sensors are configured to wirelessly communicate over a network using low power signal communication. The system includes a at least one device configured to connect to an in-wall power source, the device further configured to wirelessly communicate over the network using low power signal communication.

In some embodiments a first device is configured to connect to a light fixture, the first device connected to the in-wall power source via the light fixture. In some cases, a first device is configured to connect to a wall outlet socket, the first device connected to the in-wall power source via the wall outlet socket. The low power signal can be transmitted out of the mechanical room via at least one electrical line of the in-wall power source using power-line communication. In some embodiments, a first device is configured to replace a first light switch controlling a light, the first device connected to the in-wall power source and including a second light switch to control the light. In some embodiments, the system includes a transceiver. The transceiver is configured to receive a signal through the network using low power communication, amplify the signal to create a high power signal, and transmit the high power signal out of the mechanical room.

In some embodiments, the sensors can include one or more of the following: a pressure sensor; a temperature sensor; a pH sensor; a salinity sensor; and a wet/dry sensor. In some cases, the low power signal communication can be Bluetooth or radio frequency (RF) communication. The sensor can include a transmitter configured to transmit a signal using low power communication and the device can include a receiver configured to receive the signal using low power communication. In some cases, one of the sensors can include a processor configured to analyze data from the first sensor and generate a signal based on the data and a transmitter configured to transmit the signal based on the data.

In at least one aspect, the subject technology relates to a wireless communication system located within a mechanical room. The wireless communication system includes a backflow prevention system having a backflow preventer, a system fitting, and a test cock. The system fitting is provided on the backflow prevention, the system fitting having a first end and a second end. The test cock has a body portion having a distal end and a corresponding distal opening and a proximal end and a corresponding proximal opening. The proximal and distal openings are in fluid connection with a space defined within the body portion. A body portion fitting is disposed in the body portion, the body portion fitting providing a fluid connection with the space. A fluid sensor is in the body portion fitting and in fluid connection with the space, the fluid sensor configured to wirelessly communicate over a network using low power signal communication. The second end of the system fitting is coupled to the proximal end of the body portion. The communication system includes at least one device configured to connect to an in-wall power source, the device further configured to wirelessly communicate over the network using low power signal communication.

In some embodiments, the test sock includes a catch portion provided on the body portion, wherein an outside diameter of the catch portion is greater than an outside diameter of the proximal end of the body portion. The test cock can also include a catch groove, provided on the body portion adjacent to the catch portion. The second end of the system fitting can be sized to receive the catch portion and the system fitting can include a spring clip configured to couple to the catch groove. The test cock further can include a ball valve disposed in the body portion and in fluid connection with the distal opening and the space. In some cases, the test cock further includes a spring clip coupling the fluid sensor to the body portion fitting.

In some embodiments, a first device is configured to connect to a light fixture or wall outlet socket, or adapt an existing light switch into a communicating light switch. The low power signal communication can be one of the following: Bluetooth; and radio frequency (RF) communication. In some cases, the low power signal is transmitted out of the mechanical room via at least one electrical line of the in-wall power source using power-line communication. The wireless communication system can include a transceiver. The transceiver is configured to receive a signal through the network using low power communication, amplify the signal to create a high power signal, and transmit the high power signal out of the mechanical room.

In at least one aspect, the subject technology relates to a wireless communication system having a plurality of sensors and a light switch device. Each sensor is configured to measure data and communicate over a network using low power signal communication. The light switch device has a double switch box housing and is connected to an in-wall power source. The light switch device has a light switch on a first side of the double switch box housing connected to a light fixture. The light switch device has a communication device on a second side of the double switch box housing, the second side opposite the first side. The communication device is configured to communicate with the sensors over the network using low power signal communication to obtain the data and transmit the data to a remote gateway using high power signal communication. The remote gateway is configured to transmit the data to a cloud. At least one of the plurality of sensors is connected to a valve.

In some embodiments, the low power signal communication includes at least one of the following: Bluetooth lower energy (BLE), Zigbee, WirelessHART, and RF. In some cases, the communication device is configured to transmit the data to the remote gateway using power line communication over an electrical line of the in-wall power source, the electrical line connected to the gateway, and high power wireless transmission.

In some embodiments, the valve of the communication system is a test cock for a backflow prevention system. The test cock has a body portion having a distal end and a corresponding distal opening and a proximal end and a corresponding proximal opening, the proximal and distal openings in fluid connection with a space defined within the body portion. The test cock has a body portion fitting disposed in the body portion, the body portion fitting providing a fluid connection with the space. The test cock includes a sensor in the body portion fitting, the sensor in fluid connection with the space, wherein the second end of the system fitting is coupled to the proximal end of the body portion. In some embodiments, each sensor includes a radio-frequency identification (RFID) tag, each RFID tag configured to communicate with, and transfer power between, other RFID tags using tag to tag communication.

BRIEF DESCRIPTION OF THE DRAWINGS

Various aspects of the disclosure are discussed herein with reference to the accompanying Figures. It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. For purposes of clarity, however, not every component may be labeled in every drawing. The Figures are provided for the purposes of illustration and explanation and are not intended as a definition of the limits of the disclosure. In the Figures.

DETAILED DESCRIPTION

Figure 1:
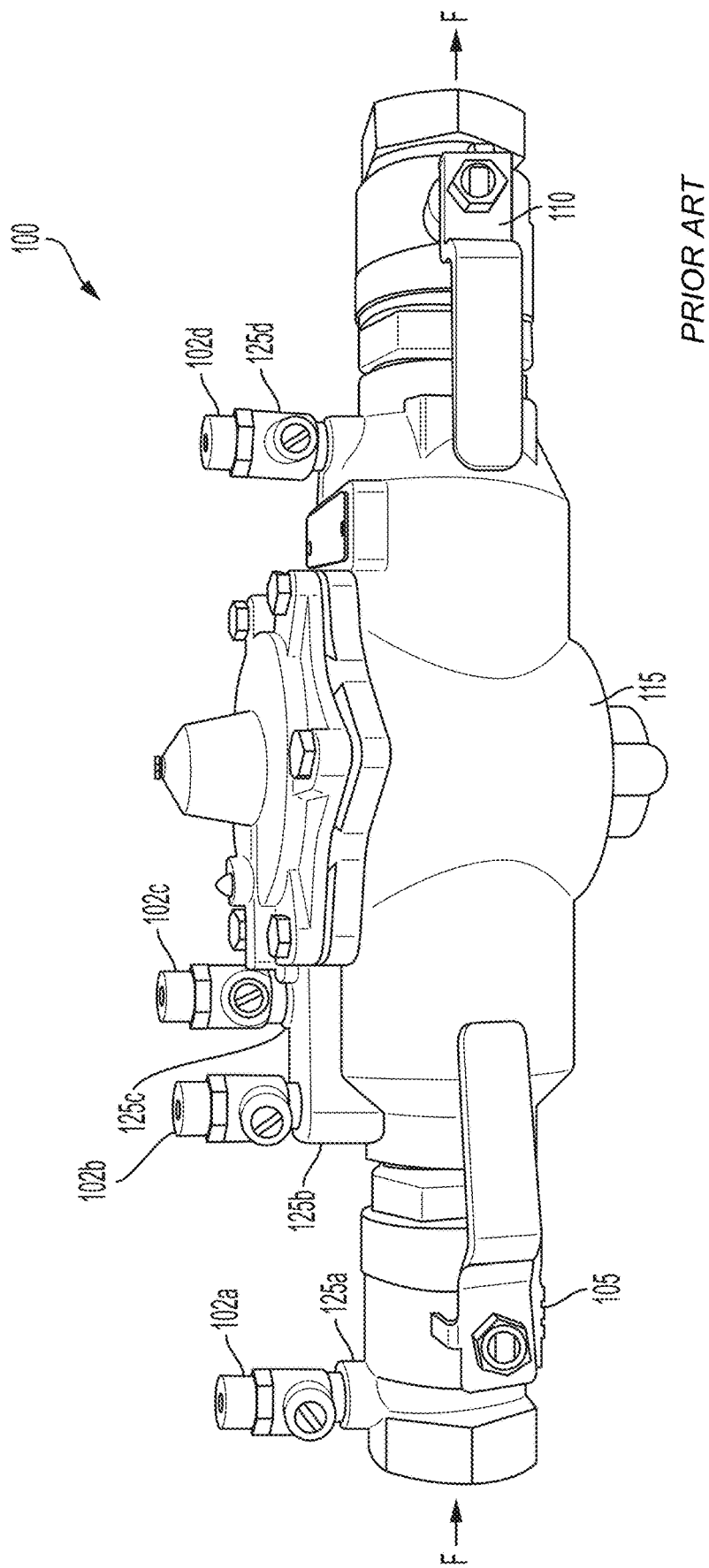
FIG. 1 is a known typical backflow preventer (BFP)

The subject technology overcomes many of the known problems associated with backflow prevention assemblies and with wireless communication of devices within and out of mechanical rooms. The advantages, and other features of the technology disclosed herein, will become more readily apparent to those having ordinary skill in the art from the following detailed description of certain exemplary embodiments taken in combination with the drawings and wherein like reference numerals identify similar structural elements. It should be noted that directional indications such as vertical, horizontal, upward, downward, right, left and the like, are used with respect to the figures and not meant in a limiting manner.

Figure 2:
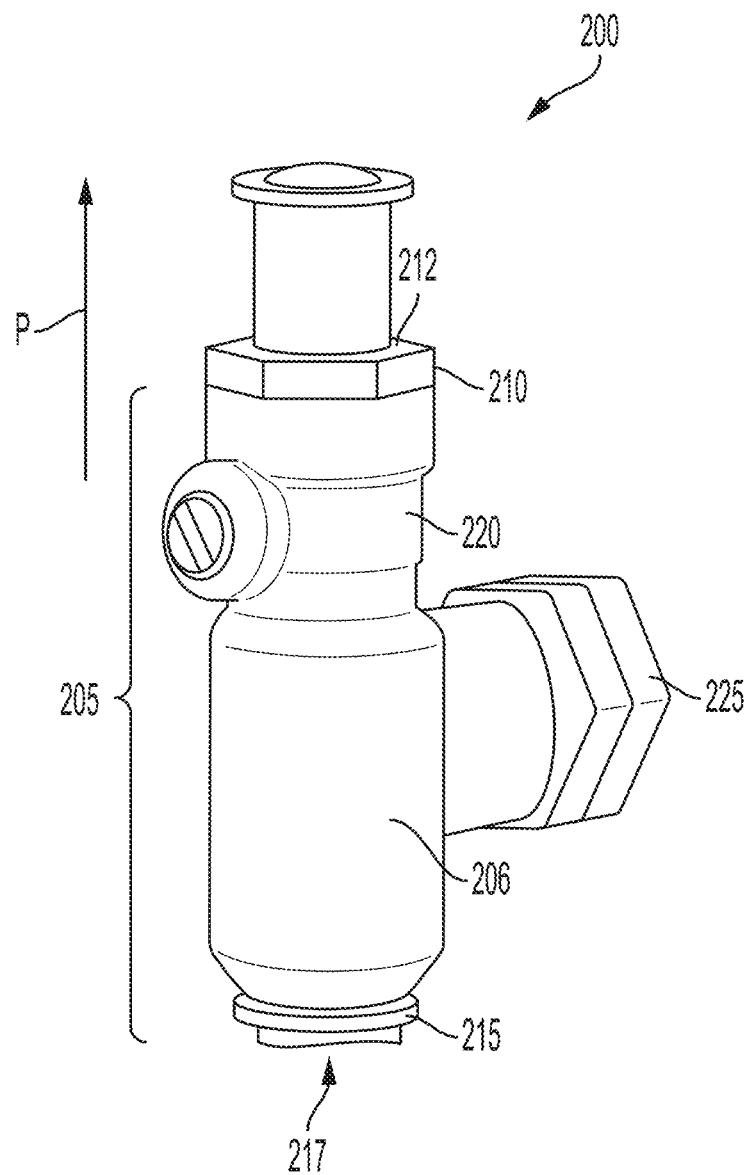
FIG. 2 is a test cock (TC), in accordance with one aspect of the present disclosure.

A test cock (TC) 200, in accordance with one aspect of the present disclosure, as shown in FIG. 2, includes an elongated body portion 205, having a space 206 defined therein, with a distal end 210, a corresponding distal opening 212, a proximal end 215 and a corresponding proximal opening 217. As shown in FIG. 2, in one embodiment, each of the distal and proximal ends 210, 215 is generally cylindrical and each of the corresponding distal and proximal openings 212, 217 is generally circular. A ball valve 220 is located near the distal end 210 and a fitting 225 is provided on the body portion 205 between the distal end 210 and the proximal end 215. The distal opening 212, the proximal opening 217, the ball valve 220 and the fitting 225 are all in fluid connection with the body portion space 206. Fluid in the test cock 200 flows in a direction P, i.e., from the proximal end 215 to the distal end 210 under normal operation and, therefore, the fitting 225 is located "upstream" from the ball valve 220. It should be noted that the elongated body portion 205 would be configured to meet any local code requirements for minimum unobstructed flow.

Figure 3:
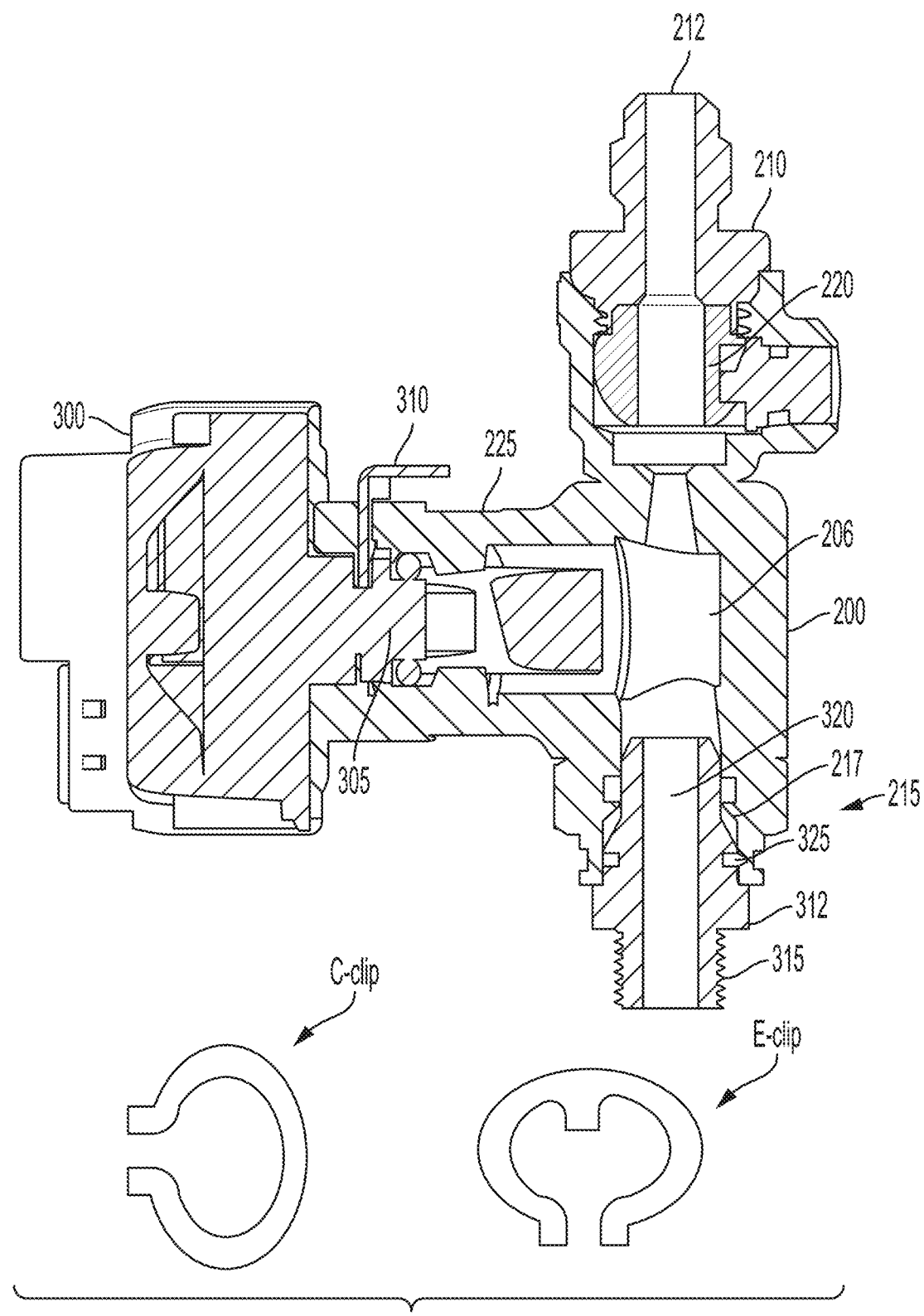
FIG. 3 is a side cutaway view of the test cock TC of FIG. 2 showing an incorporated Electronic Fluid Sensor (EFS device)

Referring now to FIG. 3, the fitting 225 is provided to couple the test cock 200 to an Electronic Fluid Sensor (EFS) device 300 that can constantly monitor a parameter of a fluid in the system. In one aspect, the EFS device 300 can include a pressure sensor to measure the fluid pressure in the system. Alternatively, sensors to measure/monitor other parameters of the fluid can be provided, for example, but not limited to, temperature, pH, salinity, a wet/dry sensor (to determine the presence or absence of a fluid), etc. The fitting 225 can be configured to receive a portion 305 of the EFS device 300 and a flexible fastening clip 310 is provided to couple the portion 305 to the fitting 225 with a fluid-tight seal. The fastening clip 310 can be an e-clip or a c-clip or the like. Alternatively, the fitting 225 can be implemented as a key- or snap-fitting.

In one approach, in accordance with an aspect of the present disclosure, a BFP fitting 312, i.e., a system fitting, is used to secure the TC 200 to the body of a BFP 100. The BFP fitting 312 includes a threaded end 315 to attach to the BFP body and a non-threaded end 320 to be received in the proximal opening 320 of the TC 200. The non-threaded end 320 allows the TC 200 to rotate, i.e., there is no constraining orientation. Another flexible fastening clip 325 is provided to couple the BFP fitting 310 to the TC 200 with a fluid-tight seal. The fastening clip 325 can be an e-clip or a c-clip or the like. Alternatively, the fitting 225 can be implemented as a key- or snap-fitting.

The EFS device 300 can be powered by a long life battery that could be replaced at one of the code-required annual tests or when indicated. Alternatively, the EFS device 300 can be hardwired to a continuous power source, such as an in-wall power line, and/or provided with a battery backup feature in the event of a power outage. Still further, the EFS device 300 can be connected to a control/monitoring system in a number of ways including, but not limited to, Ethernet, RF or other wireless transmission mechanism, etc., where a low-power status could be reported and addressed.

Figure 4:
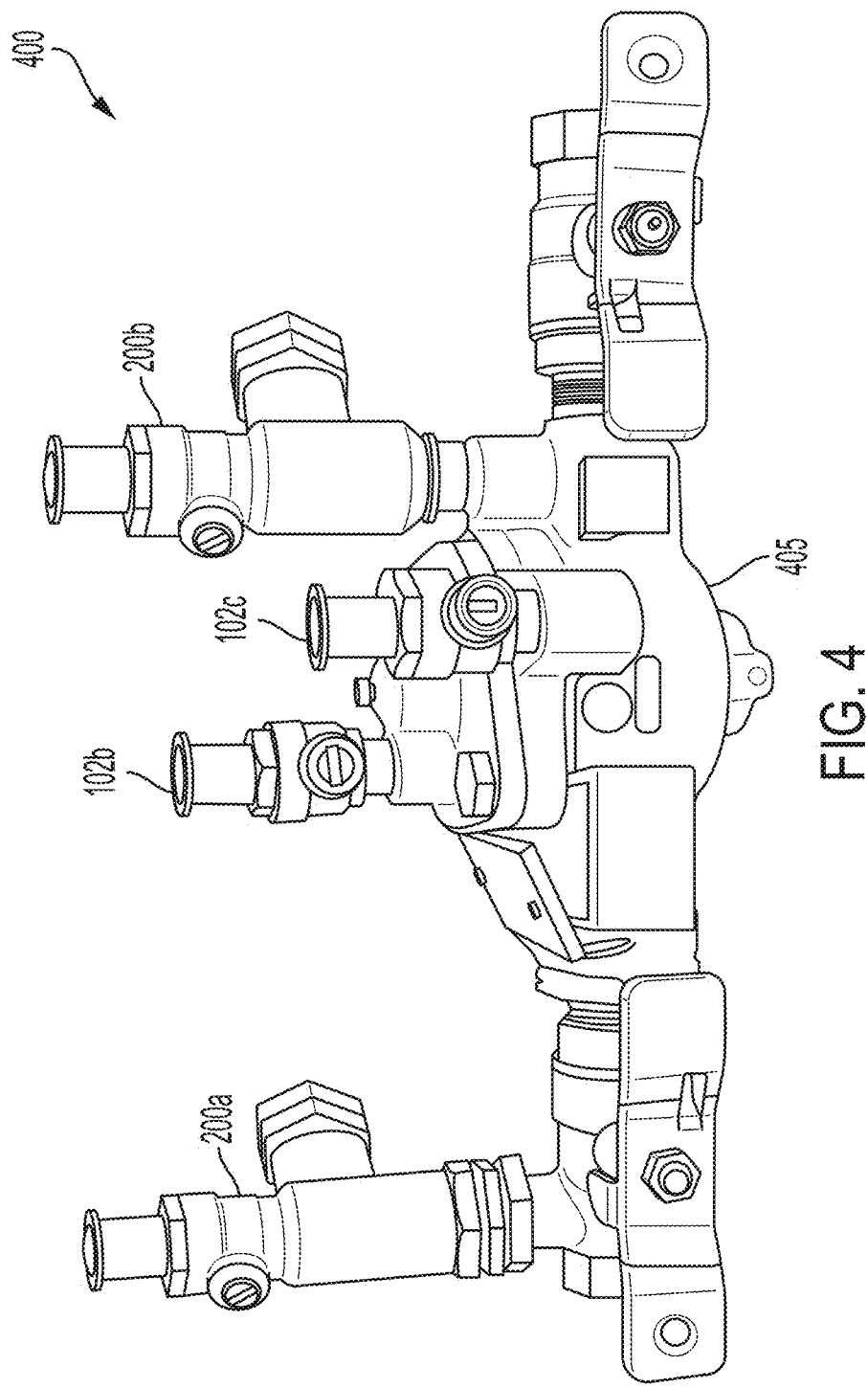
FIG. 4 is a backflow preventer including the TC of FIGS. 2 and 3.

A BFP system 400 is shown in FIG. 4 and includes a BFP 405 with two known TCs 102b, 102c installed along with two TCs 200a, 200b. It should be noted that the two TCs 200a, 200b are shown without a respective EFS device being connected for purposes of clarity. In some cases, at least three EFS devices would be deployed to determine that the BFP system 400 is functioning properly, i.e., in compliance with any relevant code(s) or requirement(s). Alternatively, in other cases, two EFS devices, or even a single EFS device, can be used.

Figure 5:
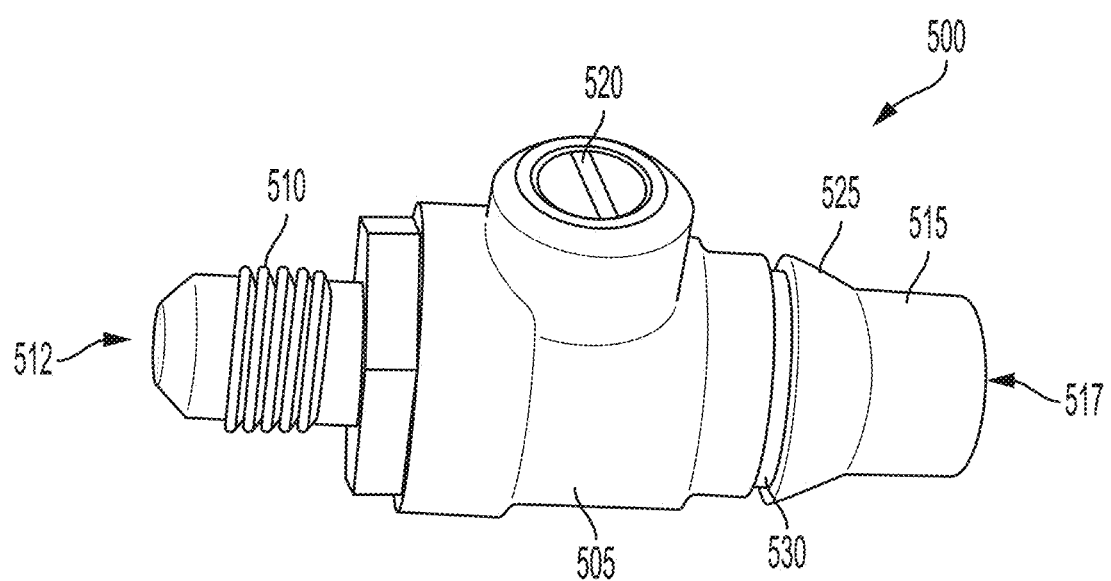
FIG. 5 is a test cock TC in accordance with another aspect of the present disclosure.

Referring now to FIG. 5, in accordance with another aspect of the present disclosure, a snap-in test cock (TC) 500 provides for the ability to swivel 360° along with a quick-disconnect feature, as will be described in more detail below. The snap-in TC 500 includes a body portion 505 having a threaded distal end 510, with a corresponding distal opening 512 and a non-threaded proximal end 515, with a corresponding proximal opening 517. As shown in FIG. 5, in one embodiment, each of the distal and proximal ends 510, 515 is generally cylindrical and each of the corresponding distal and proximal openings 512, 517 is generally circular. As per known TCs, a ball valve 520 is provided in the body portion 505. The ball valve 520, the proximal opening 517 and the distal opening 512 are all in fluid connection with a lumen provided in the snap-in TC 500.

A catch portion 525 of the body portion 505 has a larger outer diameter than the proximal end 515. A circumferential catch groove 530 is provided about the body 505 on the distal side of the catch portion 525 where the catch groove 530 has a smaller diameter than the diameter of the catch portion 525.

Figure 6:
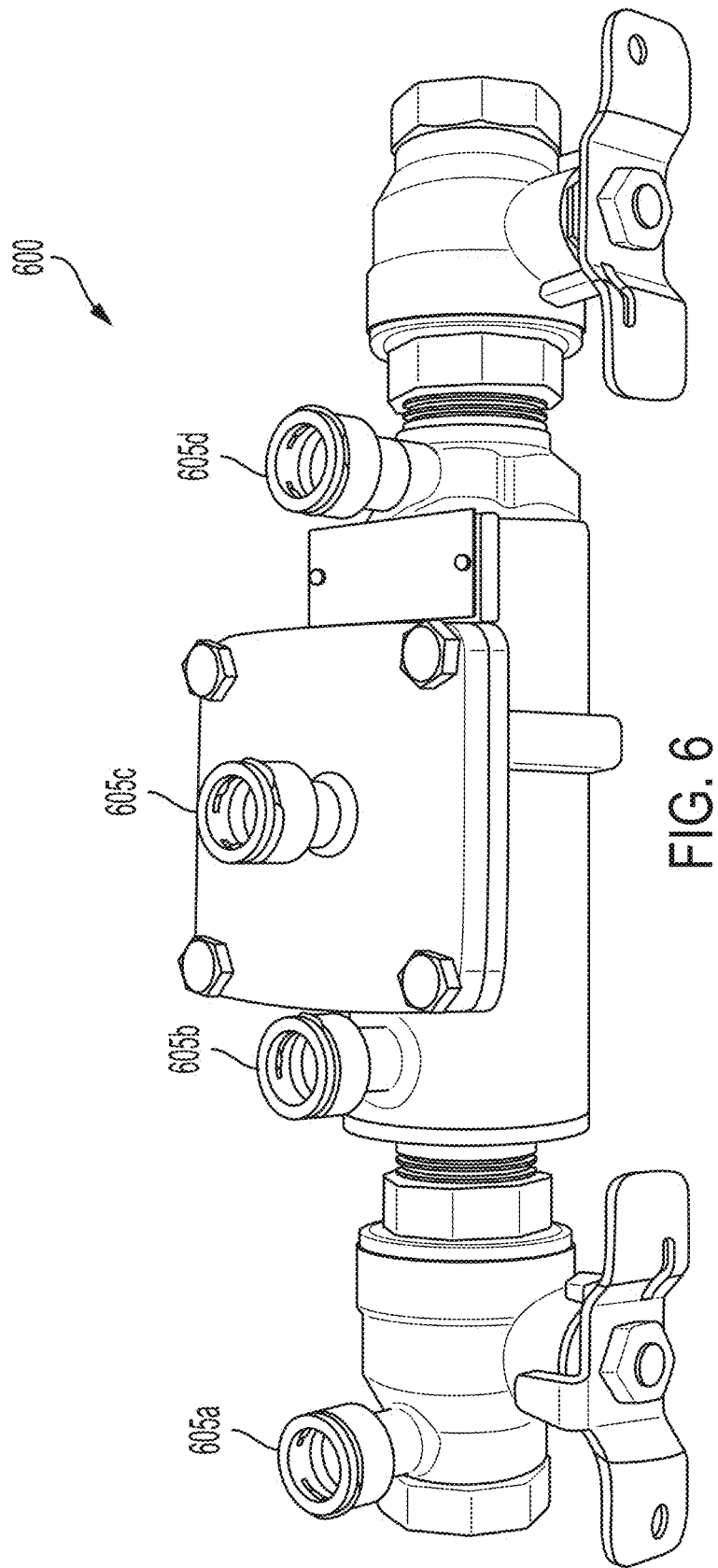
FIG. 6 is a BFP system configured to receive the TC of FIG. 5.

Referring now to FIG. 6, a backflow preventer (BFP) 600 is provided with a plurality of TC ports 605a-605d (generally 605) to couple with the snap-in TC 500, as will be described below. The TC ports 605 are arranged in a manner similar to the BFP 100 described above.

Figure 7:
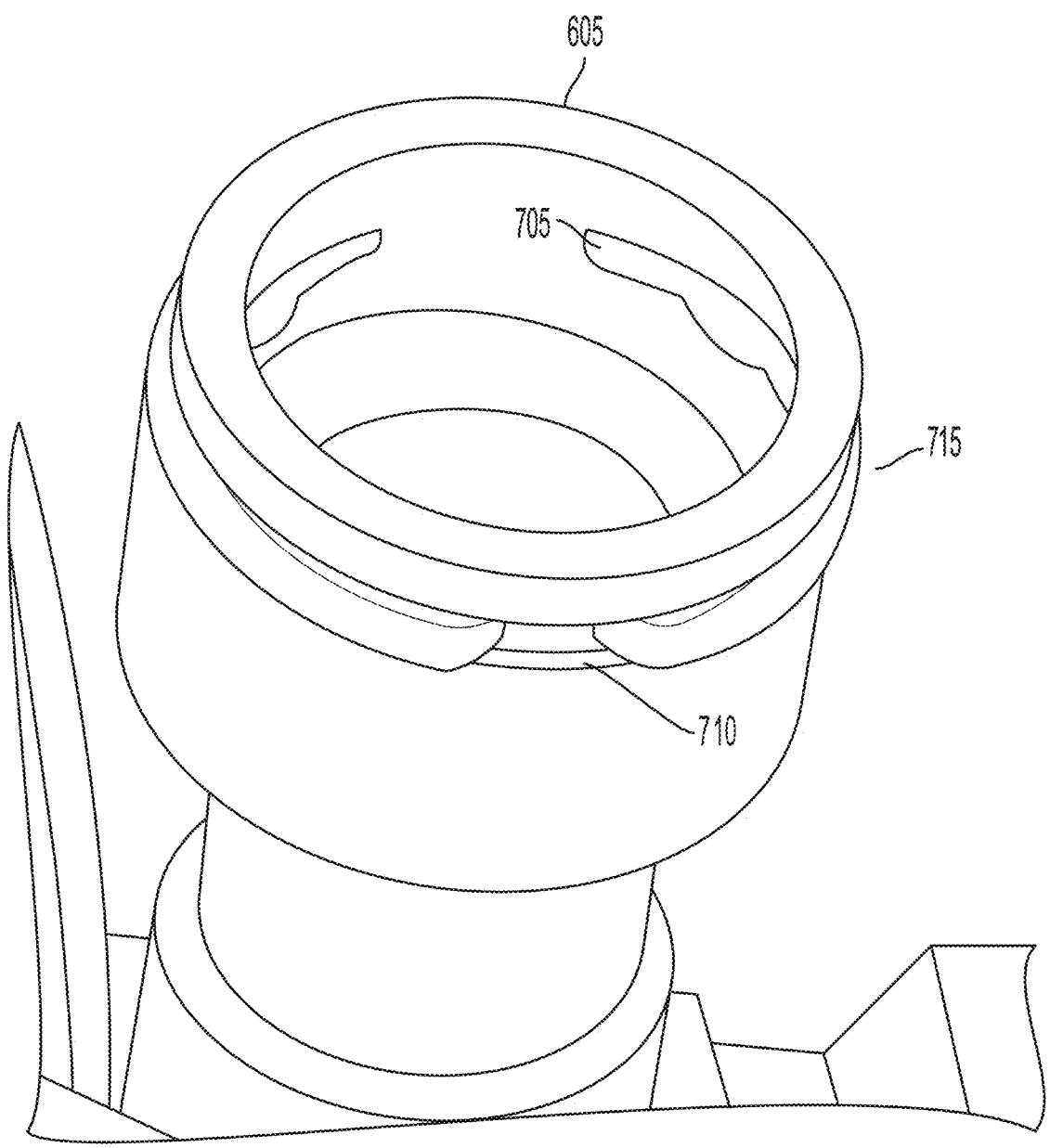
FIG. 7 is a close-up of a TC port of the BFP system of FIG. 6.
Figure 8A:
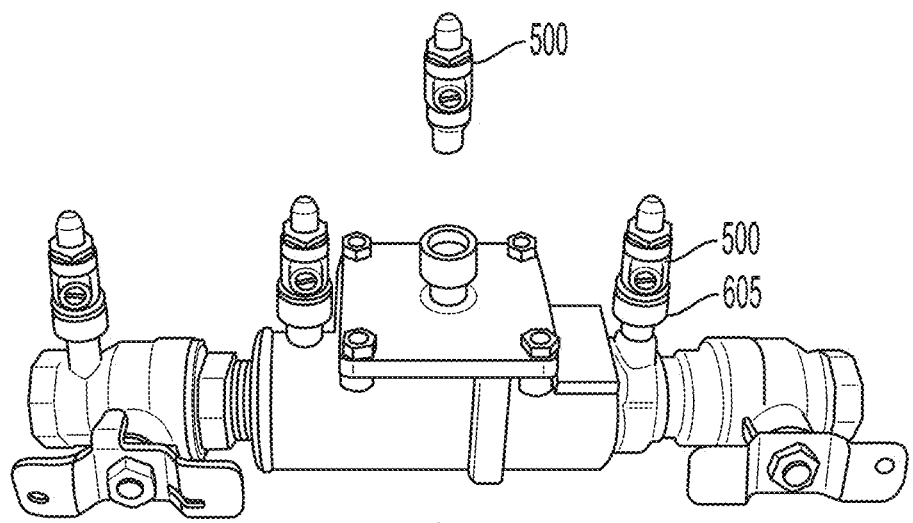
FIGS. 8A, 8B and 8C depict the insertion of a test cock of FIG. 5 into the TC port of FIG. 7.
Figure 8B:
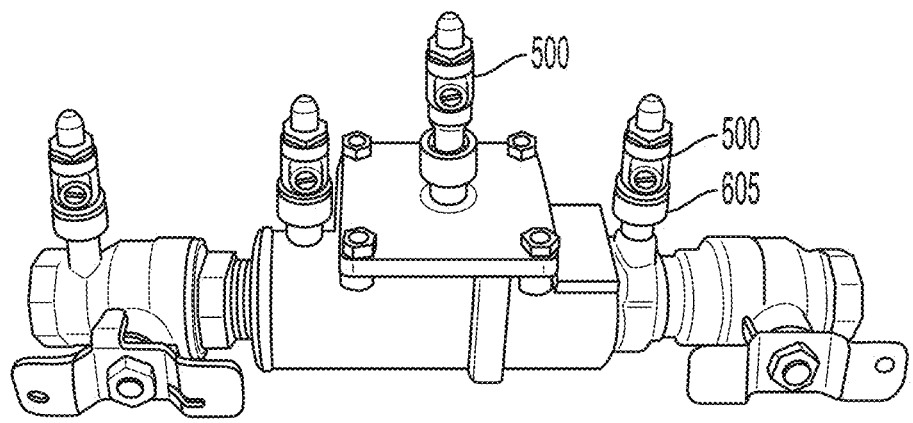
Figure 8C:
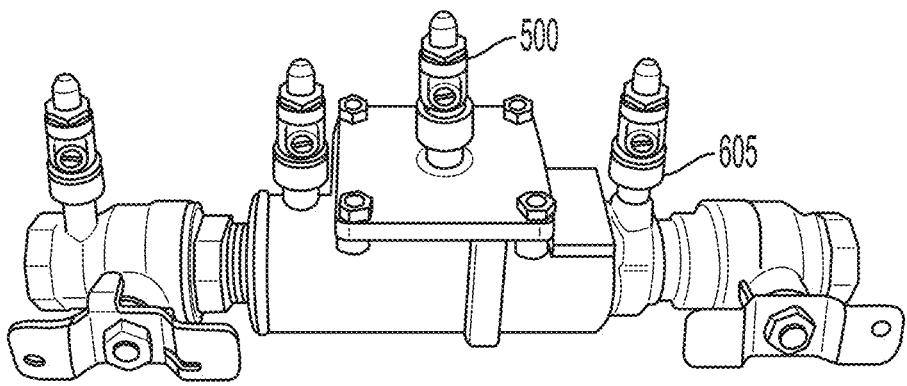

The TC port 605 may be screwed into the body of the BFP 600, as per known approaches. As shown in FIG. 7, a proximal end 705 of the TC port 605 is sized to receive the non-threaded proximal end 515 of the snap-in TC 500. A number of circumferential openings 710 are provided about the circumference of the TC port 605 and a flexible clip 715, for example, a c-clip, an e-clip or the like, is provided in the openings 710. A depth of the TC port 605 is such that, when the proximal end 515 of the snap-in TC 500 is inserted, the catch portion 525 will pass the clip 715, cause it to deform, and once the catch groove 530 is adjacent the clip 715, the clip 715 will spring back and the snap-in TC 500 will be captured, as shown in FIGS. 8A-8C. In order to remove the snap-in TC 500 from the TC portal 605, the clip 715 will have to be removed.

Alternatively, the TC port 605 may initially not have the clip 715 in place. Once the snap-in TC 500 is in position with the catch groove 530 aligned with the openings 710, the clip 715 can be inserted to couple the snap-in TC 500 to the TC port 605.

Figure 9:
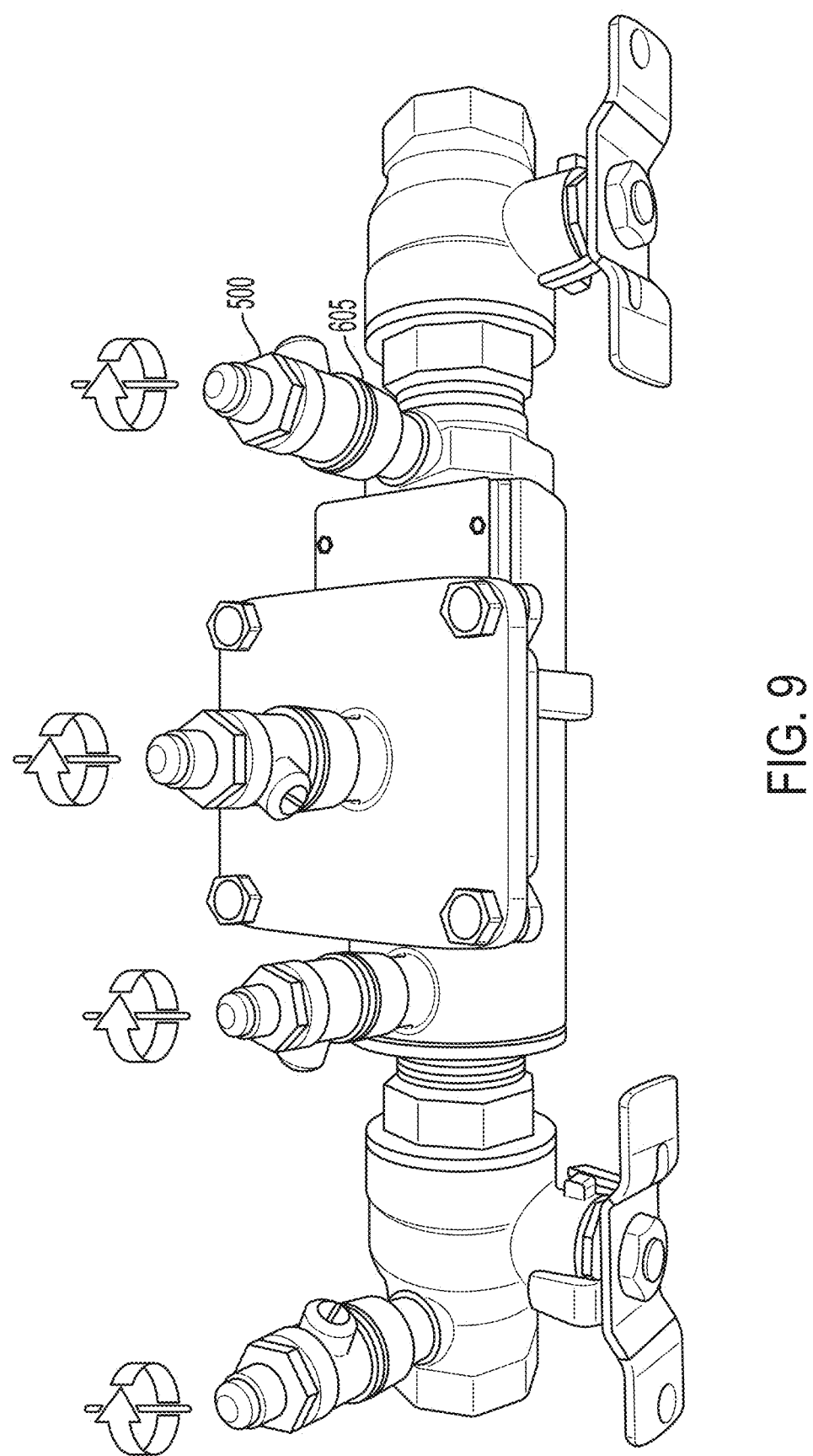
FIG. 9 shows the insertion of multiple TCs of FIG. 5 into a BFP system.

Advantageously, the snap-in TC 500 is then able to be rotated 360° as presented in FIG. 9.

In another aspect of the present disclosure, the proximal end 215 of the TC 200 can be configured as per the proximal end 515 of the snap-in TC 500. More specifically, instead of coupling to the BFP fitting 312, the proximal end 215 would include a catch portion and a circumferential catch groove as described above. Such a TC would then be inserted in a TC port 605 per the teachings set forth above.

The foregoing subject technology has a number of benefits over the known approaches, including, but not limited to: eliminating unnecessary valves, fittings and elbows as there is no need to redirect flow to a non-local EFS device; providing a TC assembly that can rotate 360° and, therefore, additional clearance is provided with a greater degree of freedom; permitting sensor installation in areas even if a full rotation is not possible, e.g., in areas where installing the sensor package with a conventional threaded connection would not be possible due to physical interference(s); and with an EFS device in each TC at multiple points on a BFP, the BFP can be continuously monitored in real-time to identify potential problems earlier without having to rely on finding an issue at the annual checkup.

Another aspect of the present disclosure presents technology that overcomes many of the known problems associated with wireless communication in mechanical rooms where BFPs are commonly located. Specifically, it is difficult to transmit and receive wireless signals from and to these mechanical rooms. Additionally, common modes of wireless communication, such as Wi-Fi and cellular data transmission, are power intensive modes that might require more power outlets than are commonly available is such rooms, or additional power lines which must be run by electricians.

Figure 10:
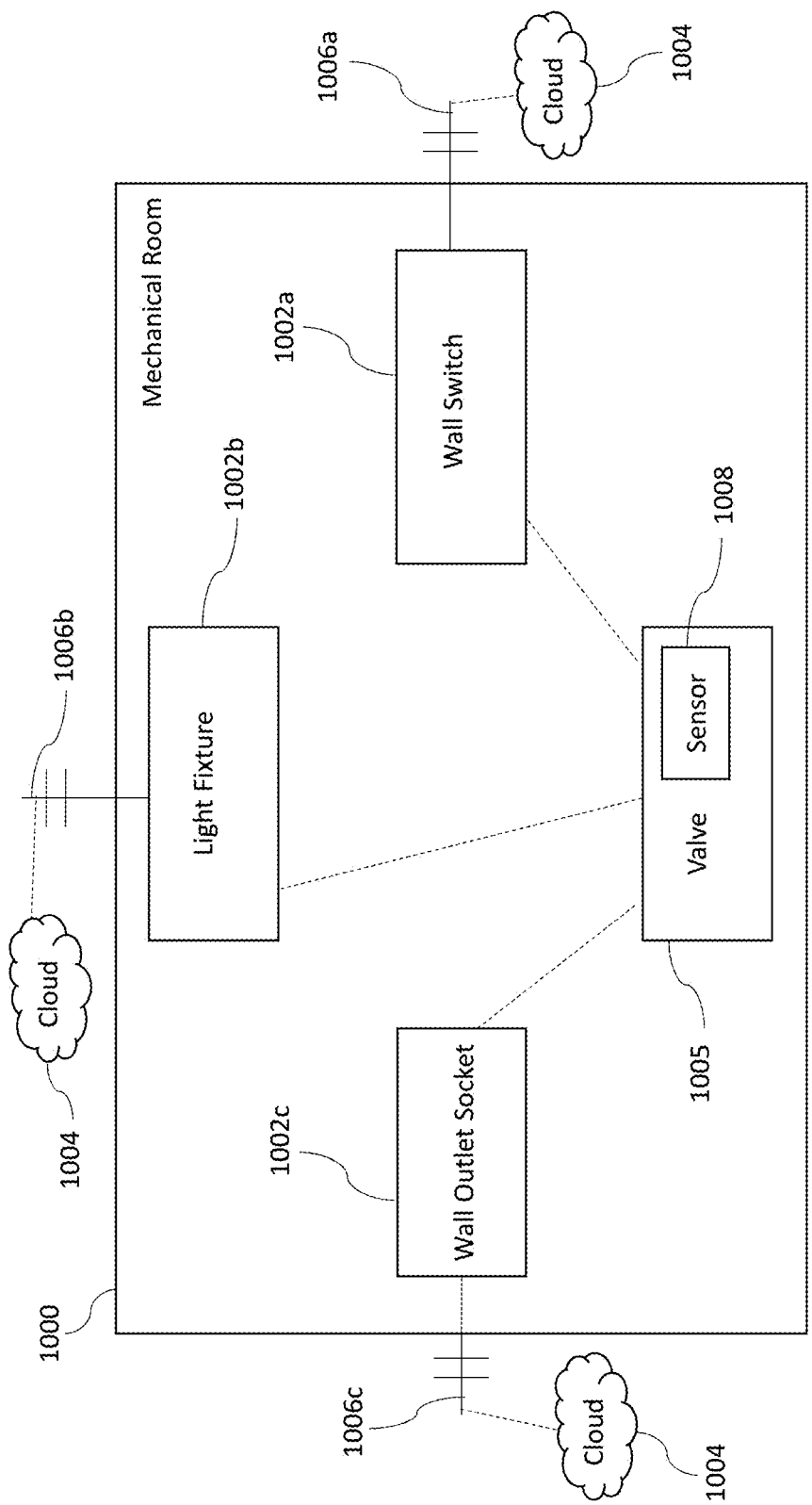
FIG. 10 is a block diagram of a wireless communication system within a mechanical room in accordance with the subject technology.

Referring now to FIG. 10, a block diagram of a mechanical room 1000 configured in accordance with the subject technology is shown. The mechanical room 1000 is an exemplary mechanical room that includes mechanical equipment for a building. In particular, the exemplary mechanical room 1000 includes a valve 1005 which controls some fluid flow through a building. Several devices 1002a-1002c (generally devices 1002) are also included in the mechanical room 1000, including a device configured to connect to or replace a wall light switch 1002a, a device connected to a light fixture 1002b, and a device configured to attach to a wall outlet socket 1002c. For a device configured to replace the light switch 1002a, the existing wall switch will be replaced by a communicating wall switch, such as a device including a transceiver for communication with other devices 1002, as discussed herein. This device 1002a would be connected to the in-wall power and continue to function as a normal light switch, controlling power to the same light as the original switch, but would include the additional communication capabilities. In this way, the existing light switch is adapted into a communicating light switch functioning as a device 1002 in accordance with the system described herein.

All devices 1002 are connected, via electrical lines 1006a-1006c, to their own in wall power source which powers the respective devices 1002, such as a main power supply for the building and/or the electrical grid. Notably, the devices 1002 within the mechanical room 1000 are exemplary only, and it should be understood that some or all devices 1002 may be omitted or replaced in different embodiments, or entirely different devices may be included, as could be found in typical mechanical rooms. Further, the devices 1002 can include other devices commonly found in mechanical rooms such a The valve 1005 can be part of a backflow preventer valve (BFP) system of the type discussed above and shown in FIGS. 1-9. The valve 1005 can further include a sensor 1008 of one of the various types used with BFP valves as discussed above. For example, the sensor 1008 can be a pressure sensor, temperature sensor, pH sensor, salinity sensor, and/or wet/dry sensor, or the like, which is configured to sense fluid properties within the valve 1005. In some cases, the valve 1005 can include multiple sensors each sensing different fluid properties. The mechanical room 1000 can also include multiple valves similar to the valve 1005, each with their own sensor or sensors.

The sensor 1008 is in wireless communication with at least one of the devices 1002 within the mechanical room 1000 over a network. The network can be formed through direct wireless communication between the devices 1002 and the sensor 1008, or by communication of all the devices 1002 and the sensor 1008 through a common transceiver or the like (not distinctly shown). The devices 1002 and sensor 1008 are configured to wirelessly communicate over the network using low power signal communication modes such as Bluetooth or RF. As such, it should be understood that all devices 1002 and the sensor 1008 can include the necessary components for wireless communication as are known in the art, such as receivers/transmitters, processors, and the like. In every case, the valve 1005 and/or sensor 1008 will include at least a transmitter for sending out data gathered by the sensor 1008 and at least one of the devices 1002 will include a receiver for receiving the data from the sensor 1008. In some cases, the valve 1005 contains a signal processor built into the sensor 1008 to analyze the data before transmitting a signal representative of that data.

Since the devices 1002 and sensor 1008 are all relatively local to each other within the mechanical room 1000, and transmission out of the mechanical room 1000 is not required for communication between the devices 1002 and sensor 1008, low power signal communication still allows for effective communication between the devices 1002 and sensor 1008 with lower bandwidth usage and power consumption. Each sensor 1008 on the system can be powered by a standard, replaceable battery. Since power consumption is low, the batteries need to be replaced infrequently and no wires are required to be run from the sensor 1008 to other power sources.

Eventually, the data from the sensor 1008 reaches one of the devices 1002. Typically, transmission out of the mechanical room 1000 can be difficult, and often is not possible using low power communication techniques. In accordance with the subject technology, there are several ways to then communicate the data out of the mechanical room 1000, to an external location where it can be processed and/or otherwise used. One way to do so is by using known power-line communication (PLC) techniques over one or more of the electrical lines 1006. PLC techniques essentially allow a power line to function secondarily as an Ethernet cable, eliminating the need to run an additional wire since the device 1002, and by association the sensor 1008, can effectively transmit data out of the mechanical room 1000 using the existing power lines 1006. For example, the device 1002 can include a transceiver connected to the power lines 1006 which can duplex the communication over the power line and out of the mechanical room 1000, avoiding the normally poor signal strength associated with transmitting out of the mechanical room 1000. Once the signal is transmitted over the power lines 1006 of the building it can be pulled off building power system at any other receptacle location. In some cases, the second location will be close to a Wi-Fi receiver or mesh network or even Ethernet port. Data received at the second location can then be communicated over the existing power lines 1006 to a central cloud 1004 where it is stored.

Figure 11:
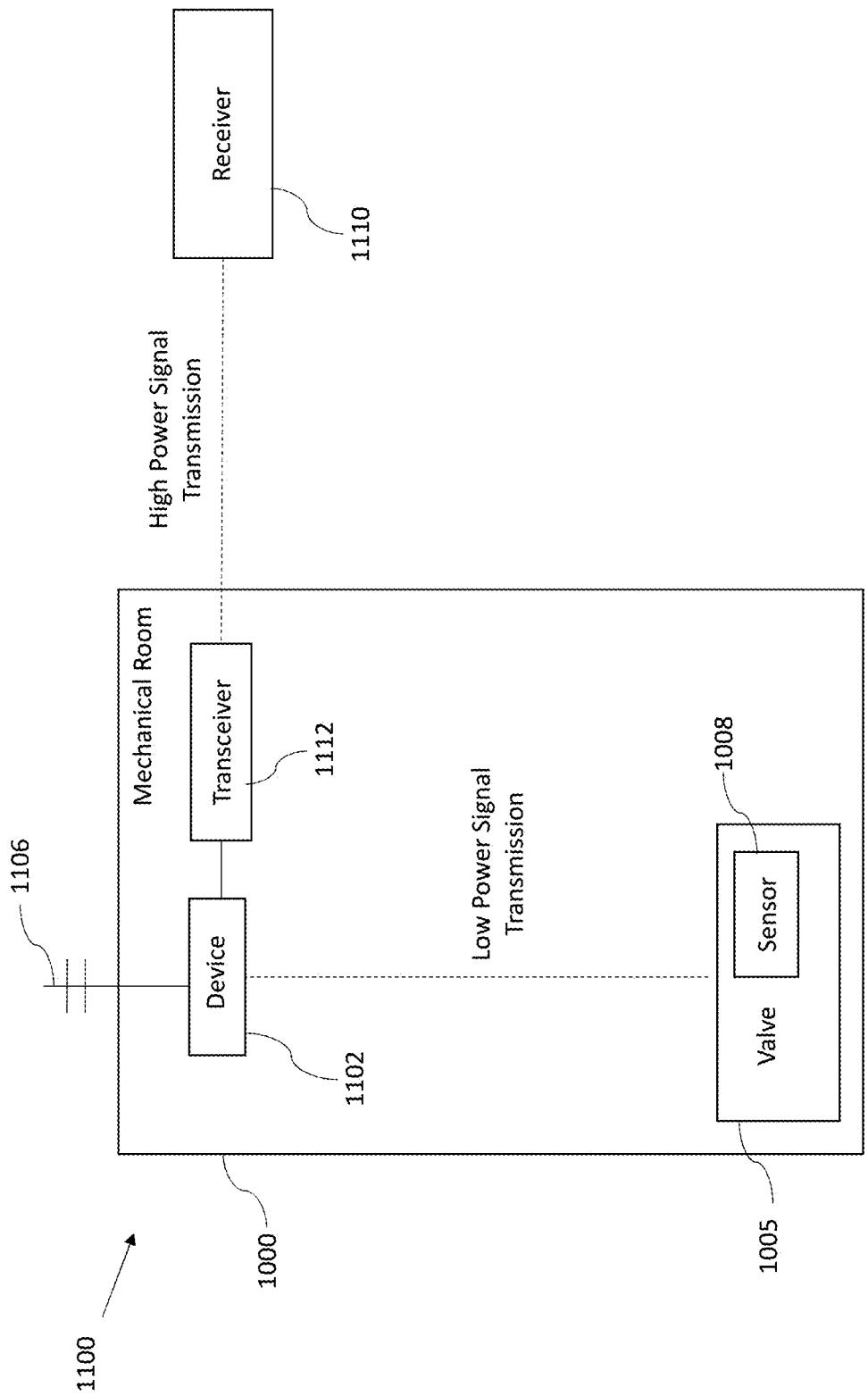
FIG. 11 is a block diagram of a wireless communication system in accordance with the subject technology.
Figure 12A:
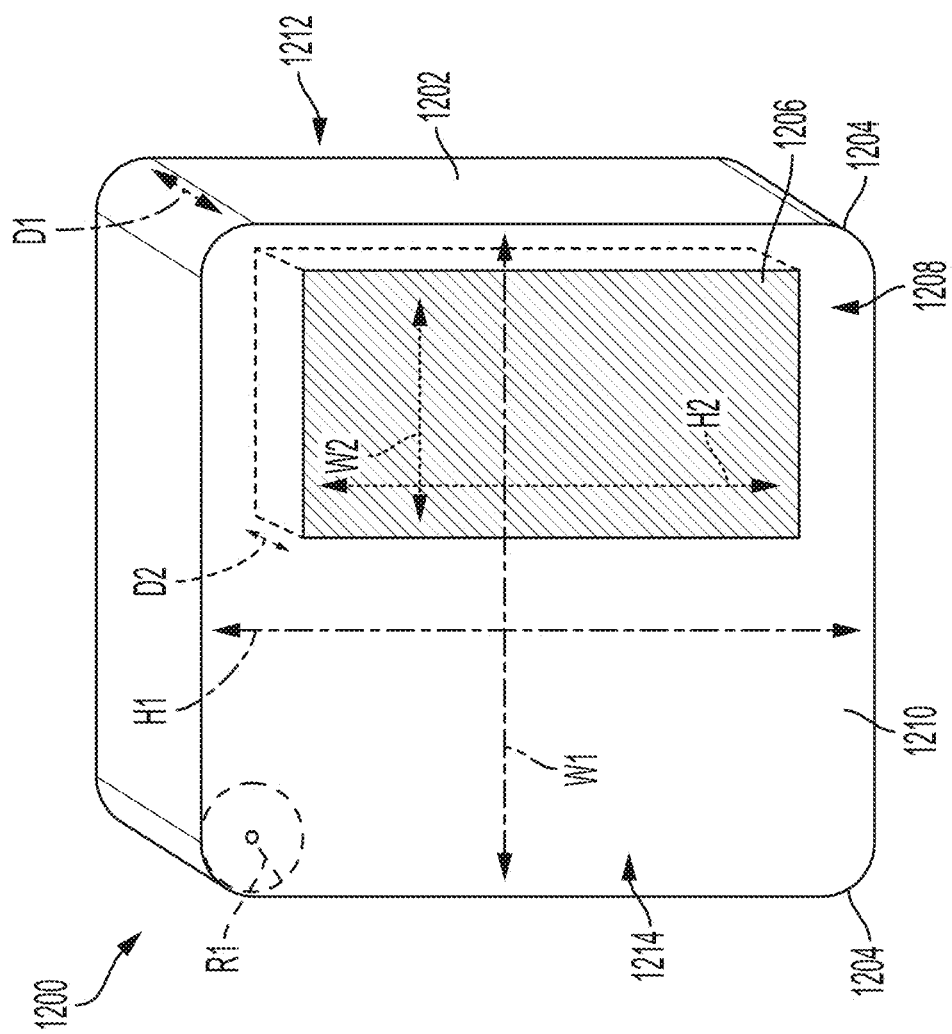
FIGS. 12a-12d are views of an exemplary light switch device configured to function as part of a wireless communication system in accordance with the subject technology.
Figure 12B:
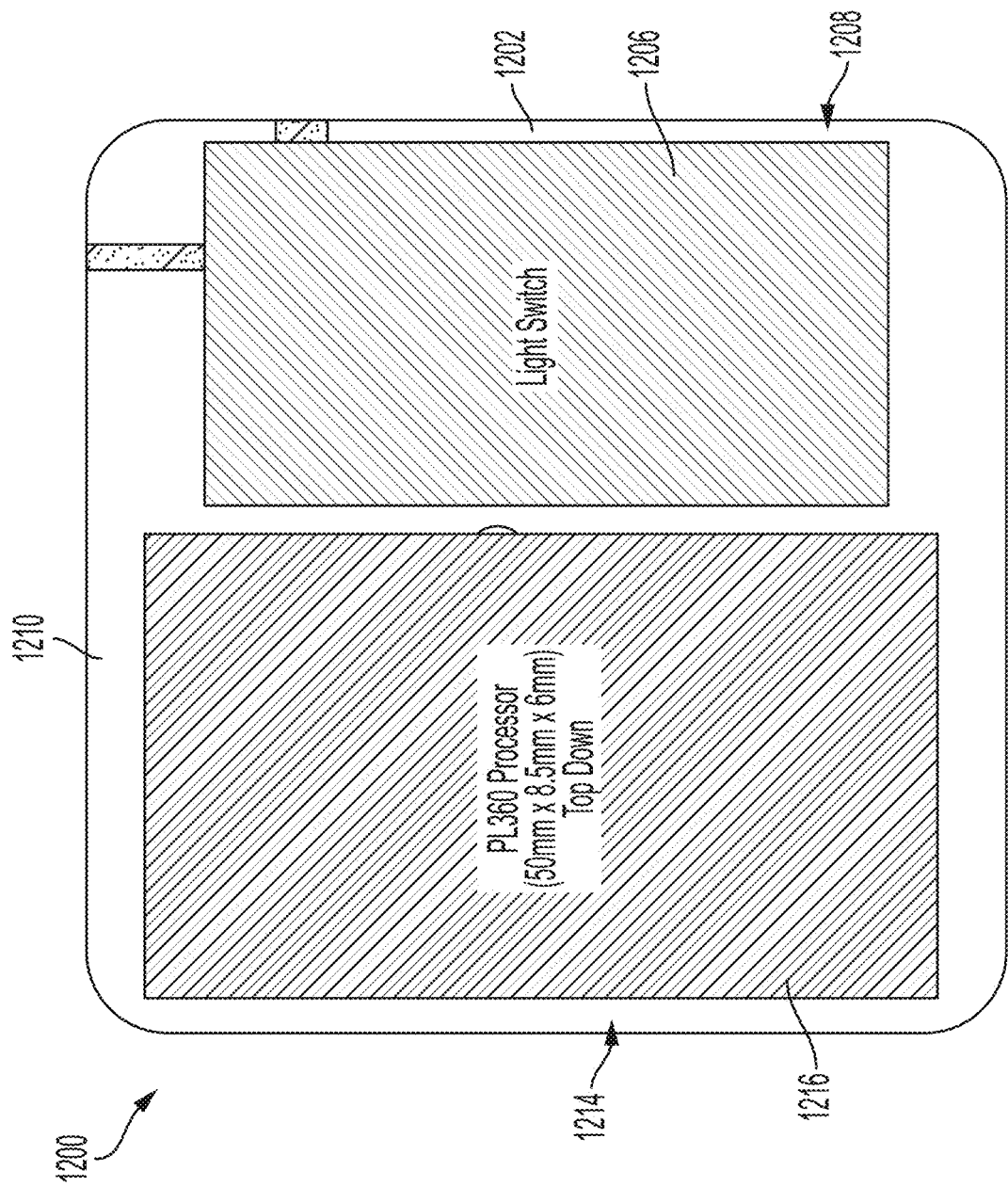
Figure 12C:
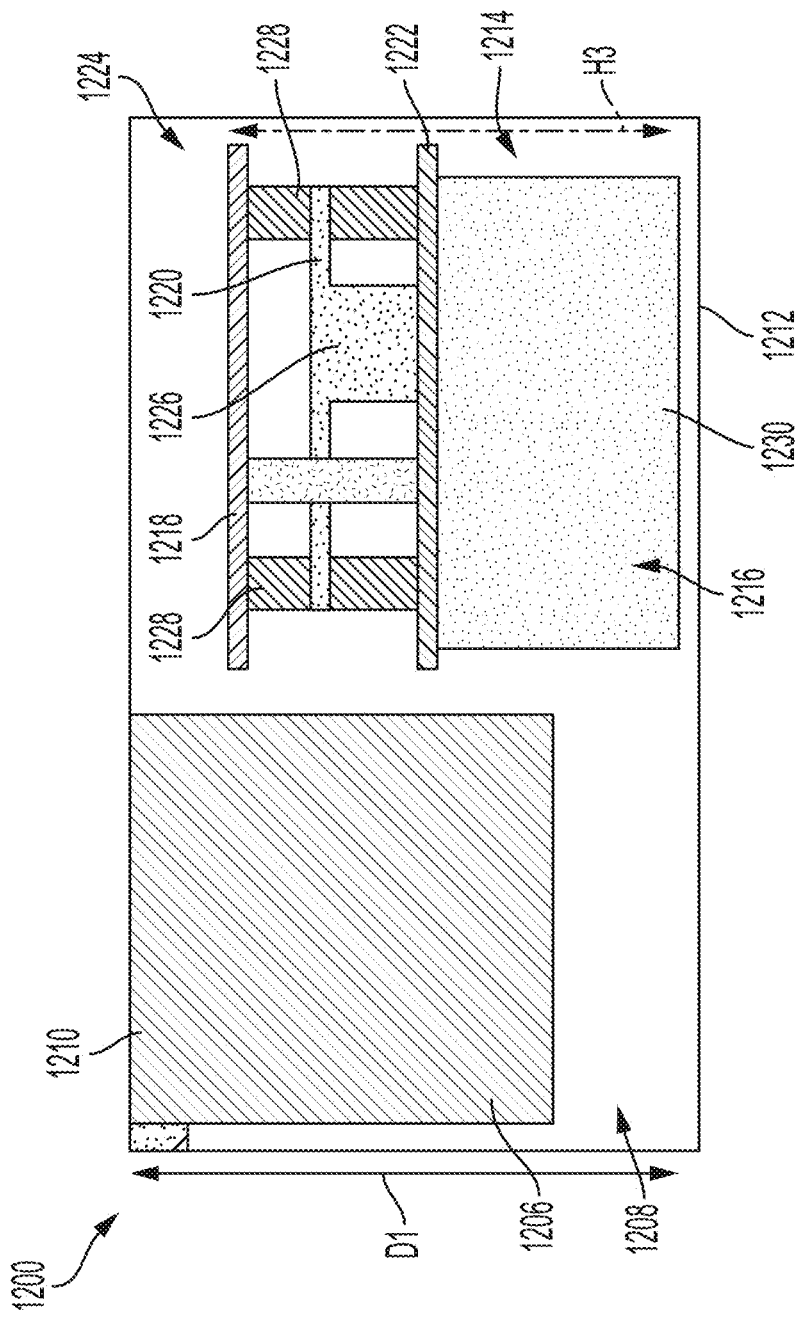
Figure 12D:
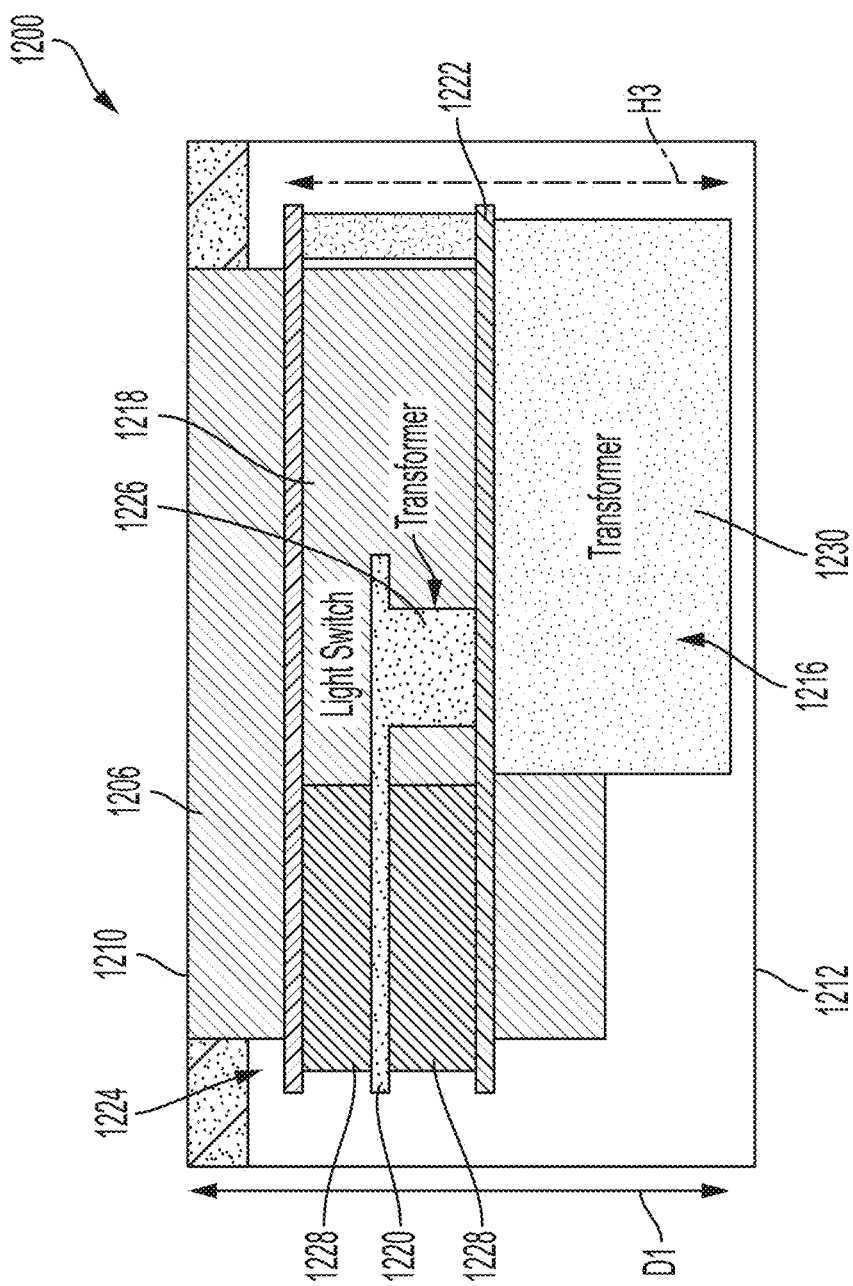

Referring now to FIG. 11, a block diagram of a wireless communication system 1100 for a mechanical room in accordance with the subject technology is shown. The system 1100 includes a mechanical room 1000 which includes a valve 1005 and sensor 1008 communicating with a single device 1102. The device 1102 is hooked up to an electrical line 1106 which is connected to an in-wall power source. Similar to the devices 1002, the device 1102 can be any type of device typically found in a mechanical room and electrically connected to an in-wall power source. The sensor 1008 and the device 1102 communicate over a network using lower power signal communication. In particular, the sensor 1008 measures properties at the valve 1005 and transmits data related to those measurements to the device 1102 which receives that data. In this way, transmission of the data from the sensor 1008 requires little power, allowing the sensor 1008 to be effectively powered by a battery.

The device 1102 is also directly connected to a transceiver 1112. The transceiver 1112 can be a separate device connected to the device 1102 through a wired connection, or can be integrated as a part of the device 1102. The transceiver 1112 is generally configured to transmit data out the mechanical room using high power signal transmission (e.g. higher power than Bluetooth or the like, such as Wi-Fi, cellular, or higher power signal) for receipt by an external receiver 1110. As such, the transceiver 1112 is configured to receive the signal from the sensor 1008 through the network using low power communication, amplify the signal to create a high power signal, and transmit the high power signal out of the mechanical room 1000 to the external receiver 1110. The transceiver 1112 can therefore include component parts configured to accomplish these tasks, including a receiver, an amplifier, a transmitter, and a processor and/or memory as needed.

Since the transceiver 1112 is directly connected to the device 1102 (i.e. locally and/or through a wired connection), the transceiver 1112 is also connected to the in wall power source via the electrical line 1106. Therefore the transceiver 1112 does not need to rely on a battery, and is able to transmit a high power signal indicative of data from the valve out of the mechanical room 1110 even though the electronics on the valve 1005 are only powered by a battery and transmitting a low powered signal. The transceiver 1112 can also be configured to receive signals from multiple different valves within the mechanical room 1000. To that end, many valves can be included in the mechanical room 1100 which provide data to the transceiver 1112 over a network using low power signal transmission, and the transceiver 1112 can be tasked with transmitting all of this data out of the mechanical room 1000 via a high power signal. As such, the bulk of the power consumption needed to communicate data from the mechanical room 1000 is handled by the transceiver 1112 which is connected to a reliable and continuous in-wall power source.

Notably, in other embodiments the mechanical room 1000 can include additional equipment such as a boiler, hot water heater, or other equipment which is hard wired to power (in place of, or in addition to, device 1102). Communication equipment, such as the transceiver 1112, could then be embedded directly therein and serve as a node for other equipment within the mechanical room 1000. Thus, the boiler, hot water heater, or other piece of equipment with embedded communication equipment could serve as a replacement to device 1102, communicating with other devices within the mechanical room 1000 over a network using low power communication. Similarly the replacement device could then transmit data out of the mechanical room 1000 using PLC, or other high power communication.

Referring now to FIGS. 12*a*-12*d*, an exemplary light switch device 1200 is shown which has been designed to replace a traditional light switch and functional as part of a wireless communication system within a mechanical room.

Mechanical rooms often include switch boxes which are setup using a standard industrial "double switch" box housing even when only one light switch is installed. The light switch device 1200 shown herein is therefore configured to utilize the housing 1202 of a double switch box housing. Thus, the housing 1202 has a width W1 of substantially 98.3 mm, a height H1 of substantially 98.3 mm, and a depth D1 of substantially 54 mm. The corners 1204 of the switch box housing 1202 are rounded, and have a radius R1 of substantially 6.35 mm as measured in the planes of the front and rear faces 1210, 1212 of the box housing 1202. A fully functional light switch 1206 is installed on a first side 1208 of the housing 1202, which can be configured to connect to an electrical power line within the building. The light switch 1206 has a width W2 of substantially 38.85 mm, a height H2 of substantially 73 mm, and a depth D2 of substantially 54 mm.

On the side 1214 of the housing 1202 opposite the light switch 1206, a communication device 1216 is installed in the remaining unused space. The communication device 1216 is configured to communicate over the network within the mechanical room using low power signal communication, and can transmit a signal out of the mechanical room using high power signal communication. Thus, the communication device 1216 is designed to be small enough to fit inside the unused space in the housing 1202, but also robust enough to carry out the intended communication functions. This is accomplished by connecting three separate PCBs 1218, 1220, 1222 in a three layer stack 1224 (see FIGS. 12*c*, 12*d*). However, it should be noted that a three layer stack 1224 is not an absolute requirement, and the components of the three layer stack 1224 shown herein may be combined in other ways, such as within a single integrated unit.

The communication device 1216 includes a communication PCB 1218 with a wireless processor on the top of the stack 1224, near the front face 1210 of the housing 1202. A PLC PCB 1220 is positioned in the middle of the stack 1224 and has a transformer 1226. A power PCB 1222 (e.g. PLCB) is positioned on the bottom of the stack 1224, near the rear face 1212 of the housing 1202, allowing the power PCB 1222 to easily connect to an in wall power source. The power PCB 1222 has a separate transformer 1230. Interconnectors 1228 on opposite sides of the stack 1224 run between the three PCBs 1218, 1220, 1222, forming an electrical connection therebetween. The stack 1224 has a height H3 of substantially 42 mm, allowing it to fit upright within the depth D1 (i.e. of 54 mm) of the housing 1202.

Figure 13:
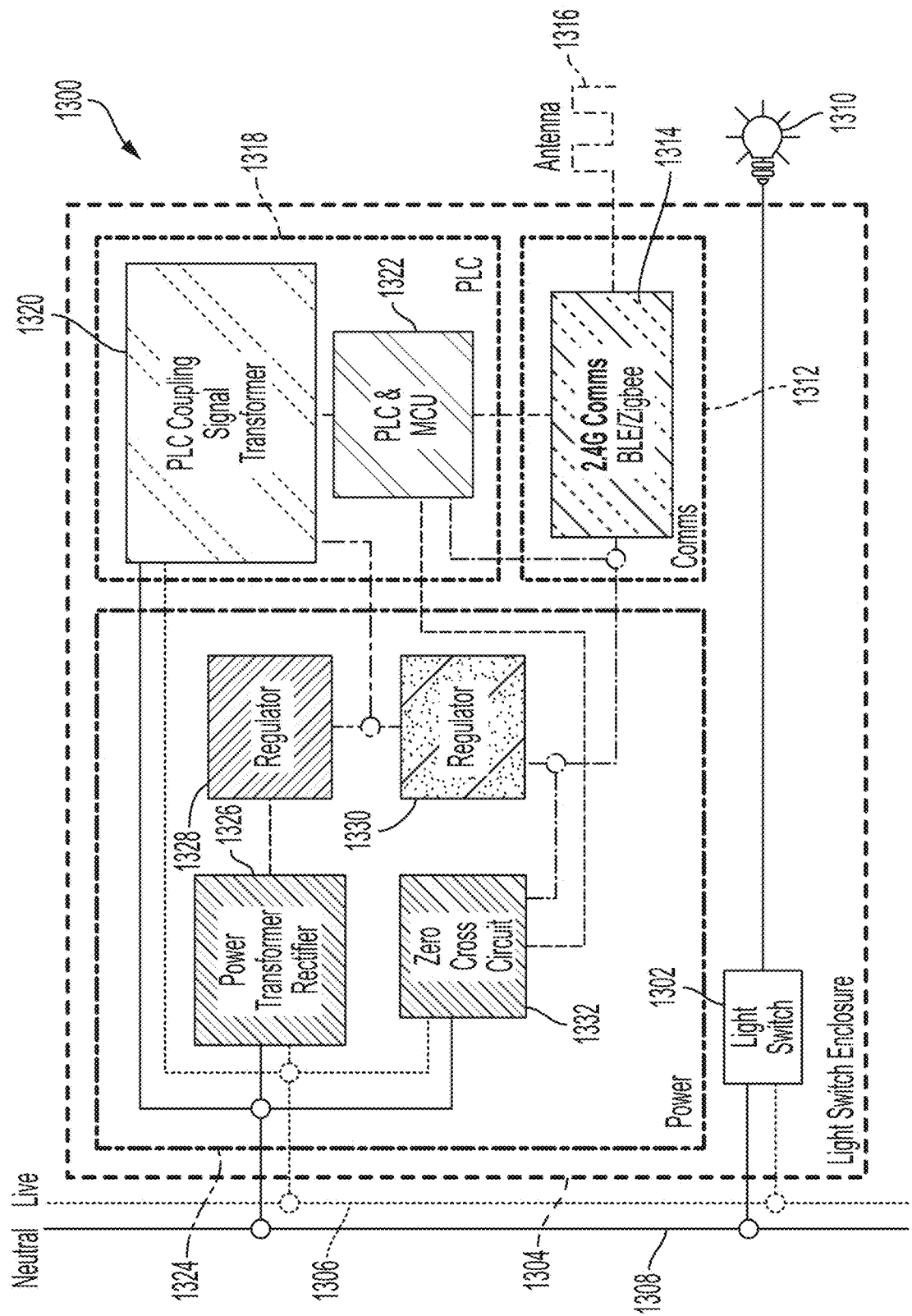
FIG. 13 is a block diagram of the electrical configuration of an exemplary light switch device configured to function as part of a wireless communication system in accordance with the subject technology.

Referring now to FIG. 13, a block diagram shows the electrical configuration of a light switch device similar to the light switch device 1200. As described above, the light switch device includes a communication device 1300 and light switch 1302 within a housing 1304 for a double switch light box. The light switch 1302 connects building power lines (i.e. live line 1306 and neutral line 1308) to power a light bulb 1310, allowing the light bulb 1310 to be switched on and off. The communication device 1300 includes a 3 PCB stack, as discussed above. The communication PCB 1312 includes a 2.4G wireless communication system 1314 connected to an antenna 1316 extending out of the housing 1304. The communication PCB 1312 is configured to wirelessly communicate with other devices within the mechanical room using low power signal communication, such as Bluetooth, Zigbee, WirelessHART, or the like. In some cases, the communication PCB 1312 can also be configured to transmit via a high powered signal communication, such as cellular or Wi-Fi, instead of, or in addition to, PLC to transmit a signal out of the mechanical room. In this way, data from devices in the mechanical room can be transmitted within the room using low power communication, and the communication PCB 1312 can then gather and transfer any data from the devices out of the mechanical room using a high power signal. A PLC PCB 1318 with a PLC coupling signal transformer 1320 and PLC/microcontroller unit 1322 couples signals between the communication PCB 1312 and a power PCB 1324.

The power PCB 1324 includes a power transformer rectifier 1326 which connects the power PCB 1324 to the power lines 1306, 1308 of the building and generates 12V DC from the building main AC. The power PCB 1324 includes two regulators 1328, 1330 which can be a 16V DC regulator 1328 and a 3V3 DC regulator 1330. The 16V DC regulator 1328 is used in the PLC PCB 1318 for amplifiers and to supply the 3V3 DC regulator 1330. A zero cross circuit 1332 monitors the main AC and detects a zero cross point, this data being fed to the PLC/microcontroller 322 of the PLC PCB 1318 for syncing transmissions to the main line frequency. The 3V3 DC regulator 1330 is used to drive the communication PCB 1312.

The communication device 1300 can advantageously be powered by the connection from the power PCB 1324 to the building powerlines 1306, 1308. Receiving power directly from the powerlines 1306, 1308 of the building can be particularly advantageous when the since the device implements a high power signal communication which requires a more significant power source then could be reliably obtained from a typical battery. Further, if the communication device 1300 is installed in an existing light switch box housing 1302, building power lines will already be running to the box, and therefore new wiring is not required. Thus, the communication device 1300 can be installed within the light switch box housing 1302 by one mechanic in a single trip to the mechanical room, without the need to install additional mechanical components or electrical wiring.

The communication devices 1300 operates using a suitable PLC protocol, such as G3-PLC. G3-PLC has been found to be suitable for use in a device within large buildings as it capable of long range, data rates greater than sensor data rates, and can be implemented with readily available microchips. PLC is carried out by superimposing a high frequency modulation onto the power cables to transmit data, with encryption and pairing handled by the PLC protocol (e.g. G3-PLC) and an evaluation module complying with FCC emission requirements.

Figure 14:
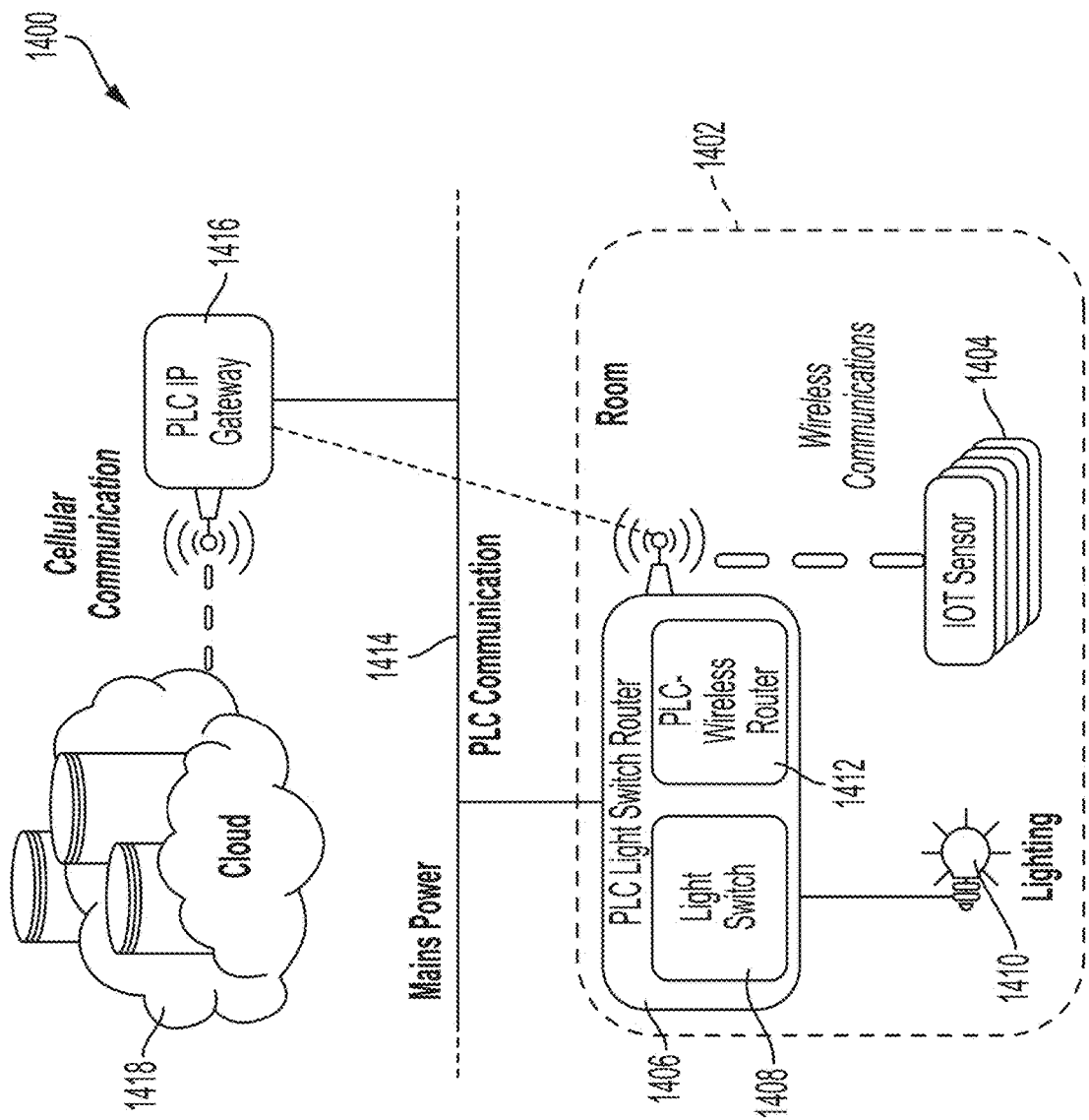
FIG. 14 is a block diagram of a wireless communication system in accordance with the subject technology.

Referring now to FIG. 14, an exemplary block diagram of a system 1400 configured to pass data between devices within a mechanical room 1402 and transmit data out of the mechanical room 1402 in accordance with the subject technology is shown.

The mechanical room 1402 includes a number of sensors 1404, which can be measurement devices connected to various pieces of equipment, such as valves, test cocks (e.g. TC 200), pipes, or the like to measure characteristics such as pressure, fluid flow, temperature, or others. All sensors 1404 are designed to be smart and connected over a network within the mechanical room 1402. The sensors 1404 transmit (and in some cases, receive) signals over the network using a low power signal. In some cases, each individual sensor 1404 will be powered by a dedicated battery. Thus, low power signal communication allows the sensors 1404 to conserve power, increasing battery life and requiring less frequent battery replacement.

The mechanical room 1402 also includes a light switch device 1406 contained within a light box housing, which can be similar to the light switch device 1200 discussed above, except where otherwise shown and described. The light switch device 1406 is connected to a main building power line 1414 to receive power, and for PLC. The light switch device 1406 includes a light switch 1408 and a communication device 1412 which can be similar to the communication devices 1216, 1300, except where otherwise shown and described. The light switch 1408 is connected to a lighting fixture 1410 within the mechanical room 1402. The communication device 1412 is configured to communicate with the sensors 1404 using low power signal communication. In particular, all sensors 1404 within the mechanical room 1402 can report to the communication device 1412 using low power signal communication. The communication device 1412 is configured to transmit the received data from the sensors 1404 out of the mechanical room 1402 using high power signal communication. In particular, the communication device 1412 is configured to transmit data over the building power line 1414 (using PLC) or through a wireless signal (or through some combination of both). For example, wireless transmission out of a mechanical room 1402 can be unreliable. Therefore the communication device 1412 can transmit using PLC when the wireless signal is poor. Alternatively, the communication device 1412 can be configured to primarily use PLC, switching to wireless communication when using the power line 1414 for communication is undesirable.

The signal transmitted out of the mechanical room 1402 can be transmitted to a remote PLC IP gateway 1416 (i.e. a wireless router) elsewhere in the building. The gateway 1416 can be positioned in the building in an area with much better wireless coverage, as compared to the mechanical room 1402. Therefore, once the signal has reached the gateway 1416, the signal can be transmitted out of the building for storage in a cloud 1418, or other storage location, where the data can be accessed by other devices. Alternatively, a number of additional linked routers 1416 or repeaters could be used to transmit the signal from the gateway 1416 out of the building and to a desired storage location or device.

In some cases, each sensor 1404 can have a radio-frequency identification (RFID) tag. The RFID tags each include an integrated circuit and antenna configured to transmit data over the network and to the communication device 1412 using low power radio frequency. Since the communication device 1412 may be further away from some sensors 1404 then others, the sensors 1404 can also transmit signals in between one another using tag to tag communication, with one or more sensors 1404 closest to the communication device 1412 ultimately providing data directly to the communication device 1412. Transmissions from a given RFID tag include a unique identifier which allows the communication device 1412 to identify which sensor 1404 each signal (or data) originated from. The RFID tags can be passive tags with no internal power source, the tags being powered by energy transmitted from the communication device 1412. In some cases, a dedicated power source can be placed within the mechanical room near one or more of the RFID tags and the RFID tags can provide unit to unit power between one another. In other cases, one or more RFID tags can be active tags each including a dedicated power source so that the RFID tag need not be powered by an external source, allowing the RFID tag to remain always on if desired.

While various low power signal types are discussed herein, it should be understood that low power signals can include Bluetooth lower energy (BLE), Zigbee, WirelessHART, RF, or the like, in different embodiments. Likewise, while various high power signal types are discussed herein, it should be understood that high power signals can include cellular, wireless, or the like in difference embodiments. These examples are in no way meant to be all inclusive, it being understood that one of ordinary skill in the art will be familiar with other similar low and high power signal types which may be utilized.

It will be appreciated by those of ordinary skill in the pertinent art that the functions of several elements may, in alternative embodiments, be carried out by fewer elements, or by a single element. Similarly, in some other alternate embodiments, any functional element may perform fewer, or different, operations than those described with respect to the illustrated embodiment. Also, functional elements (e.g., check valves, shut-off valves, and the like) shown as distinct for purposes of illustration may be incorporated within other functional elements in a particular implementation.

While the subject technology has been described with respect to various embodiments, those skilled in the art will readily appreciate that various changes and/or modifications can be made to the subject technology without departing from the scope of the present disclosure.

What is claimed is:

1. A wireless communication system located within a mechanical room, the wireless communication system comprising:
   a backflow prevention system having:
      a backflow preventer;
      a system fitting provided on the backflow preventer, the system fitting having a first end and a second end; and
      a test cock, having: a body portion having a distal end and a corresponding distal opening, a proximal end and a corresponding proximal opening, the proximal and distal openings in fluid connection with a space defined within the body portion; a body portion fitting disposed in the body portion, the body portion fitting providing a fluid connection with the space; and a fluid sensor configured to wirelessly communicate over a network using low power signal communication, the fluid sensor provided in the body portion fitting, in fluid connection with the space, wherein the second end of the system fitting is coupled to the proximal end of the body portion; and
   at least one device configured to connect to an in-wall power source, the device further configured to wirelessly communicate over the network using low power signal communication; and
   the test cock further comprising:
      a catch portion provided on the body portion, wherein an outside diameter of the catch portion is greater than an outside diameter of the proximal end of the body portion; and
      a catch groove, provided on the body portion, adjacent to the catch portion,
   wherein the second end of the system fitting is sized to receive the catch portion, and
   wherein the system fitting further comprises a spring clip configured to couple to the catch groove.

2. The wireless communication system of claim 1, wherein the test cock further comprises a ball valve, disposed in the body portion, in fluid connection with the distal opening and the space.

3. The wireless communication system of claim 1, wherein the test cock further comprises a spring clip coupling the fluid sensor to the body portion fitting.

4. The wireless communication system of claim 1, wherein a first device of the at least one device is configured to connect to a light fixture or wall outlet socket, or adapt an existing light switch into a communicating light switch, wherein the first device includes a transceiver for transmitting data.

5. The wireless communication system of claim 1, wherein the low power signal communication is one of the following: Bluetooth; and radio frequency (RF) communication.

6. The wireless communication system of claim 1, wherein the low power signal is transmitted out of the mechanical room via at least one electrical line of the in-wall power source using power-line communication.

7. The wireless communication system of claim 1, further comprising: a transceiver configured to:
receive a signal through the network using low power communication;
amplify the signal to create a high power signal; and
transmit the high power signal out of the mechanical room.

8. The wireless communication system of claim 1, wherein the at least one device is selected from the group consisting of: a light switch device; a light fixture; an outlet socket; and combinations thereof.

9. A wireless communication system comprising:
a plurality of sensors, each sensor configured to measure data and communicate over a network using low power signal communication; and
a light switch device having a double switch box housing, the light switch device connected to an in-wall power source having:
a light switch on a first side of the double switch box housing connected to a light fixture; and
a communication device on a second side of the double switch box housing, the second side opposite the first side, the communication device configured to: communicate with the sensors over the network using low power signal communication to obtain the data; and transmit the data to a remote gateway using high power signal communication,
wherein:
the remote gateway is configured to transmit the data to a cloud; and
at least one of the plurality of sensors is connected to a valve; and
each sensor includes a radio-frequency identification (RFID) tag, each RFID tag configured to communicate with, and transfer power between, other RFID tags using tag to tag communication.

10. The wireless communication system of claim 9, wherein the low power signal communication includes at least one of the following: Bluetooth lower energy (BLE), Zigbee, WirelessHART, and RF; and
the communication device is configured to transmit the data to the remote gateway using: power line communication over an electrical line of the in-wall power source, the electrical line connected to the gateway; and high power wireless transmission.

11. The wireless communication system of claim 9 wherein the valve is a test cock for a backflow prevention system, the test cock having:
a body portion having a distal end and a corresponding distal opening, a proximal end and a corresponding proximal opening, the proximal and distal openings in fluid connection with a space defined within the body portion;
a body portion fitting disposed in the body portion, the body portion fitting providing a fluid connection with the space; and
the at least one of the plurality of sensors connected to the valve, the at least one of the plurality of sensors provided in the body portion fitting, in fluid connection with the space, wherein the second end of the system fitting is coupled to the proximal end of the body portion.

12. A wireless communication system located within a mechanical room, the wireless communication system comprising:
a backflow prevention system having:
a backflow preventer;
a system fitting provided on the backflow preventer, the system fitting having a first end and a second end; and
a test cock, having: a body portion having a distal end and a corresponding distal opening, a proximal end and a corresponding proximal opening, the proximal and distal openings in fluid connection with a space defined within the body portion; a body portion fitting disposed in the body portion, the body portion fitting providing a fluid connection with the space; and a fluid sensor configured to wirelessly communicate over a network using low power signal communication, the fluid sensor provided in the body portion fitting, in fluid connection with the space, wherein the second end of the system fitting is coupled to the proximal end of the body portion;
a device configured to connect to an in-wall power source, the device further comprising a wireless receiver to receive wireless communications from the fluid sensor over the network using low power signal communication, and a transceiver to transmit the wireless communications out of the mechanical room; and
a spring clip coupling the fluid sensor to the body portion fitting.

13. The wireless communication system of claim 12, wherein the test cock further comprises a ball valve, disposed in the body portion, in fluid connection with the distal opening and the space.

14. The wireless communication system of claim 12, wherein a first device of the device is configured to connect to a light fixture or wall outlet socket, or adapt an existing light switch into a communicating light switch.

15. The wireless communication system of claim 12, wherein the low power signal is transmitted out of the mechanical room via at least one electrical line of the in-wall power source using power-line communication and the low power signal communication is one of the following: Bluetooth; and radio frequency (RF) communication.

16. The wireless communication system of claim 12, wherein the transceiver is configured to: receive a signal through the network using low power communication; amplify the signal to create a high power signal; and transmit the high power signal out of the mechanical room.

* * * * *